(12) United States Patent
Unnikrishnan et al.

(10) Patent No.: US 12,026,954 B2
(45) Date of Patent: Jul. 2, 2024

(54) STATIC OCCUPANCY TRACKING

(71) Applicant: QUALCOMM Incorporated, San Diego, CA (US)

(72) Inventors: Jayakrishnan Unnikrishnan, Jersey City, NJ (US); Yoga Y Nadaraajan, Poway, CA (US); Avdhut Joshi, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 17/452,552

(22) Filed: Oct. 27, 2021

(65) Prior Publication Data

US 2022/0237402 A1    Jul. 28, 2022

Related U.S. Application Data

(60) Provisional application No. 63/141,292, filed on Jan. 25, 2021.

(51) Int. Cl.
*G06N 3/02* (2006.01)
*G06V 20/56* (2022.01)
*G06V 20/58* (2022.01)

(52) U.S. Cl.
CPC .............. *G06V 20/58* (2022.01); *G06N 3/02* (2013.01); *G06V 20/588* (2022.01)

(58) Field of Classification Search
CPC ....................................................... G06N 3/02
See application file for complete search history.

(56) References Cited

U.S. PATENT DOCUMENTS

2020/0211213 A1* 7/2020 Das ........................... G01S 5/18

OTHER PUBLICATIONS

Thomas et al: "Predicting Semantic Map Representations From Images Using Pyramid Occupancy Networks", 2020 IEEE/CVF Conference On Computer Vision and Pattern Recognition (CVPR), IEEE, Jun. 13, 2020 (Jun. 13, 2020) pp. 11135-11144, XP033805072, DOI: 10.1109/CVPR42600.2020.01115 (Year: 2020).*
Andriamahefa T.R., "Integer Occupancy Grids: A Probabilistic Multi-Sensor Fusion Framework for Embedded Perception", Feb. 21, 2017 (Feb. 21, 2017), XP055615155, 179 Pages, Chapter 3.

(Continued)

*Primary Examiner* — Myron Wyche
(74) *Attorney, Agent, or Firm* — Polsinelli/Qualcomm

(57) ABSTRACT

Techniques and systems are provided for determining static occupancy. For example, an apparatus can be configured to determine one or more pixels associated with one or more static objects depicted in one or more images of a three-dimensional space. The apparatus can be configured to obtain a point map including a plurality of map points, the plurality of map points corresponding to a portion of the three-dimensional space. The apparatus can be configured to determine, based on the point map and the one or more pixels associated with the one or more static objects, a probability of occupancy by the one or more static objects in the portion of the three-dimensional space. The apparatus can be configured to combine information across multiple images of the three-dimensional space, and can determine probabilities of occupancy for all cells in a static occupancy grid that is associated with the three-dimensional space.

30 Claims, 18 Drawing Sheets

(56) References Cited

OTHER PUBLICATIONS

International Search Report and Written Opinion—PCT/US2022/012368—ISA/EPO—Apr. 26, 2022.
Joubert D., et al., "Adaptive Occupancy Grid Mapping with Measurement and Pose Uncertainty", Nov. 30, 2012 (Nov. 30, 2012), XP055676698, 83 Pages, Definition 2.3.3 Section 2.3.2.1 Chapter 2.
Thomas R., et al., "Predicting Semantic Map Representations from Images Using Pyramid Occupancy Networks", 2020 IEEE/CVF Conference on Computer Vision and Pattern Recognition (CVPR), IEEE, Jun. 13, 2020 (Jun. 13, 2020), pp. 11135-11144, XP033805072, DOI: 10.1109/CVPR42600.2020.01115 [Retrieved on Aug. 3, 2020] Section 3 Section 4.4 Section 5.2 Abstract Figures 3,4 Table 2.

\* cited by examiner

STATIC OCCUPANCY TRACKING

CROSS-REFERENCE TO RELATED APPLICATIONS

The present application claims the benefit of U.S. Provisional Application No. 63/141,292, filed Jan. 25, 2021, entitled "STATIC OCCUPANCY TRACKING," which is hereby incorporated by reference in its entirety and for all purposes.

FIELD

The present disclosure generally relates to performing static occupancy tracking. Some aspects of the present disclosure include systems and techniques for performing static occupancy grid tracking using boundary information (e.g., defining one or more boundaries of a drivable space), point maps, and/or other information.

BACKGROUND

Object detection can be used to identify an object (e.g., from a digital image or a video frame of a video clip). Object tracking can be used to track a detected object over time. Object detection and tracking can be used in different fields, including autonomous driving, video analytics, security systems, robotics, aviation, among many others. In some fields, an object can determine positions of other objects in an environment so that the object can accurately navigate through the environment (e.g., to make accurate motion planning and trajectory planning decisions). In some cases, the object may not expect other objects (e.g., static objects) when traversing through the environment. It can be important for the object to be able to detect such unexpected objects and to accurately navigate the space relative to such objects.

Examples of fields where an object needs to be able to determine the position and/or location of other objects include autonomous driving by autonomous driving systems (e.g., of autonomous vehicles), autonomous navigation by a robotic system (e.g., an automated vacuum cleaner, an automated surgical device, etc.), aviation systems, among others. Using autonomous driving systems as an example, a critical requirement for autonomous driving is the ability of an autonomous vehicle to detect unexpected objects on a road and to accurately determine the extent of the drivable space on the road. For instance, some static objects on a road can appear unexpectedly as the vehicle is driving, such as obstacles near a construction zone, obstacles in the road, etc. Detection and/or tracking of unexpected objects can be difficult in some cases.

SUMMARY

Systems and techniques are described herein for performing static occupancy tracking (e.g., static occupancy grid tracking) using various types of input information, such as boundary information defining a drivable space (e.g., boundary information outputs from one or more machine learning models, such as one or more camera drivable space network outputs, boundary information outputs from a computer vision algorithm, etc.), information from one or more point maps, and/or other information. For instance, the static occupancy tracking can be used to detect one or more static objects. According to one illustrative example, a method of detecting one or more static objects is provided. The method includes: determining, by a computing device, one or more pixels associated with one or more static objects depicted in an image of a three-dimensional space, wherein the one or more static objects are static with respect to the three-dimensional space; obtaining, by the computing device, a point map including a plurality of map points, the plurality of map points corresponding to a portion of the three-dimensional space; and determining, by the computing device based on the point map and the one or more pixels associated with the one or more static objects, a probability of occupancy by the one or more static objects in the portion of the three-dimensional space.

In another example, an apparatus for detecting one or more static objects is provided that includes a memory and one or more processors (e.g., implemented in circuitry) and coupled to the memory. The one or more processors are configured to and can: determine one or more pixels associated with one or more static objects depicted in an image of a three-dimensional space, wherein the one or more static objects are static with respect to the three-dimensional space; obtain a point map including a plurality of map points, the plurality of map points corresponding to a portion of the three-dimensional space; and determine, based on the point map and the one or more pixels associated with the one or more static objects, a probability of occupancy by the one or more static objects in the portion of the three-dimensional space.

In another example, a non-transitory computer-readable medium is provided that has stored thereon instructions that, when executed by one or more processors, cause the one or more processors to: determine one or more pixels associated with one or more static objects depicted in an image of a three-dimensional space, wherein the one or more static objects are static with respect to the three-dimensional space; obtain a point map including a plurality of map points, the plurality of map points corresponding to a portion of the three-dimensional space; and determine, based on the point map and the one or more pixels associated with the one or more static objects, a probability of occupancy by the one or more static objects in the portion of the three-dimensional space.

In another example, an apparatus for detecting one or more static objects is provided. The apparatus includes: means for determining one or more pixels associated with one or more static objects depicted in an image of a three-dimensional space, wherein the one or more static objects are static with respect to the three-dimensional space; means for obtaining a point map including a plurality of map points, the plurality of map points corresponding to a portion of the three-dimensional space; and means for determining, based on the point map and the one or more pixels associated with the one or more static objects, a probability of occupancy by the one or more static objects in the portion of the three-dimensional space.

In some examples, a vehicle including components for determining static occupancy is provided. The vehicle can include one or more cameras configured to capture a plurality of images, a memory configured to store the plurality of images, and one or more processors implemented in circuitry and coupled to the memory. The one or more processors are configured to and can perform any of the techniques described above. For example, the one or more processes can be configured to and can: determine one or more pixels associated with one or more static objects depicted in an image of a three-dimensional space; obtain a point map including a plurality of map points, the plurality of map points corresponding to a portion of the three-dimensional space; and determine, based on the point map and the one or more pixels associated with the one or more static objects, a probability of occupancy by the one or more static objects in the portion of the three-dimensional space.

In some aspects, each pixel of the one or more pixels is a lower-most pixel in a column of the image that is occupied by a static object of the one or more static objects in the three-dimensional space. In some cases, the column of the image includes a column of pixels of the image.

In some aspects, the one or more pixels associated with the one or more static objects are determined based on one or more machine learning models. In some cases, each machine learning model of the one or more machine learning models includes a deep learning neural network configured to predict that the one or more pixels are occupied by at least one object in the three-dimensional space. In some examples, the deep learning neural network is further configured to predict whether each pixel of the one or more pixels is associated with a static object or a dynamic object. In some aspects, a machine learning model of the one or more machine learning models is associated with a camera used to capture the image.

In some aspects, to determine the probability of occupancy by the one or more static objects in the portion of the three-dimensional space, the method, apparatuses, vehicle, and computer-readable medium described above can include determining (or can be configured to determine) a probability of occupancy for each cell in a grid associated with the portion of the three-dimensional space. In some cases, the method, apparatuses, vehicle, and computer-readable medium described above further comprise updating the probability of occupancy for each cell using a Bayesian filter. In some examples, to determine the probability of occupancy for each cell in the grid, the method, apparatuses, vehicle, and computer-readable medium described above include determining (or can be configured to determine) probabilities of occupancy for all cells of the grid within a rectangular region around an object including the computing device. In some aspects, the object including the computing device is a vehicle.

In some aspects, the method, apparatuses, vehicle, and computer-readable medium described above further comprise: determining, based on a pixel of the one or more pixels in a column of the image, a line of intersection of a plane of the grid and a plane corresponding to the column; and determining one or more probabilities of occupancy for one or more points along the line of intersection.

In some aspects, the method, apparatuses, vehicle, and computer-readable medium described above further comprise determining a probability of occupancy for a cell in the grid at least in part by determining a representative probability of occupancy from at least the one or more probabilities of occupancy for the one or more points along the line of intersection.

In some aspects, the representative probability of occupancy includes one of a maximum probability or a mean probability.

In some aspects, the one or more probabilities of occupancy are determined based on information from the point map. In some cases, the information from the point map includes at least a height associated with a point on the plane of the grid.

In some aspects, the point map includes a high definition (HD) map.

In some aspects, the portion of the three-dimensional space includes a driving surface in the three-dimensional space. In some aspects, the one or more static objects are located on the driving surface.

In some aspects, the one or more pixels associated with the one or more static objects are generated at least in part by processing the image using a computer vision algorithm. In some cases, the computer vision algorithm is configured to perform temporal tracking to estimate the one or more pixels.

In some aspects, the computing device and/or apparatus is, is part of, and/or includes a vehicle or a computing device or component of a vehicle (e.g., an autonomous vehicle), a robotics device or system or a computing device or component of a robotics device or system, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a camera, or other device. In some aspects, the computing device, apparatuses, and/or vehicle includes a camera or multiple cameras for capturing one or more images. In some aspects, the computing device, apparatuses, and/or vehicle further includes a display for displaying one or more images, notifications, and/or other displayable data. In some aspects, the computing device, apparatuses, and/or vehicle described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
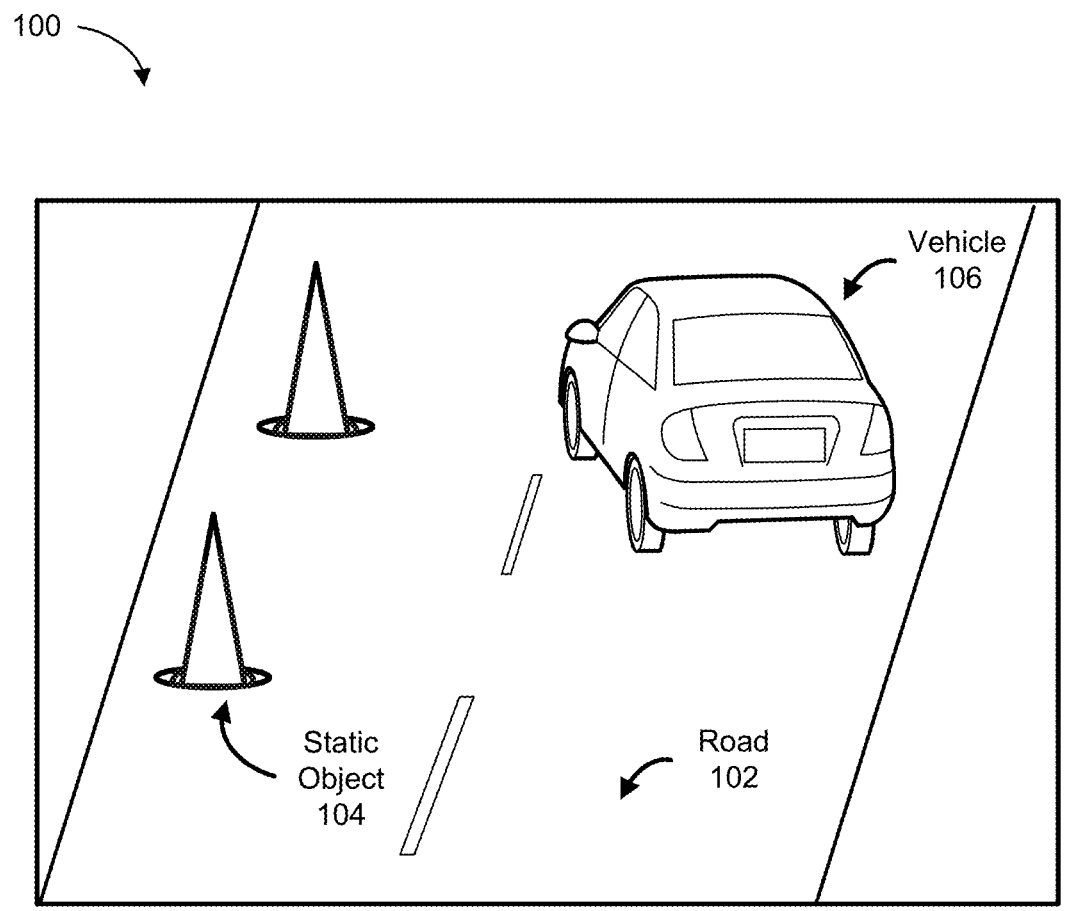
FIG. 1 is an image illustrating a road including static objects and a vehicle driving on the road, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Object detection and tracking can be used to identify an object and track the object over time. For example, an image of an object can be obtained, and object detection can be performed on the image to detect one or more objects in the image. In some cases, the detected object can be classified into a category of object and a bounding region can be generated to identify a location of the object in the image. Various types of systems can be used for object detection, including neural network-based object detectors.

Object detection and tracking can be used in various types of systems, including autonomous driving systems, video analytics, security systems, robotics systems, aviation systems, among others systems. In such systems, an object (referred to as a tracking object) moving through an environment or space and tracking other objects (referred to as target objects) in the environment can determine positions (and in some cases sizes) of the other objects. Determining the positions (and in some cases sizes) of target objects in the environment allow the tracking object to accurately navigate through the environment by making intelligent motion planning and trajectory planning decisions.

In some cases, unexpected objects may appear in the path of a tracking object when the tracking object is moving through the environment. For instance, static and dynamic objects can appear unexpectedly in the environment. It can be important for the tracking object to be able to detect such unexpected objects and to accurately navigate the space (e.g., in order to avoid such objects). It can be straightforward to detect and/or track such unexpected objects if the tracking object is equipped with certain sensors that can perform light-based (e.g., laser-based) detection and/or tracking, such as time-of-flight systems (e.g., using a light detection and ranging (LIDAR) sensor). However, it can be challenging to detect and/or track unexpected objects using other types of sensors, such as camera-based systems that utilize images or frames to perform detection and/or tracking. In some cases, camera-based systems are more economical than time-of-flight based systems.

One example of a field where a tracking object needs to be able to accurately detect and track target objects is autonomous driving by autonomous driving systems (e.g., of autonomous vehicles). An important goal of autonomous driving systems is the ability of an autonomous vehicle to detect unexpected objects on a driving surface (e.g., a road, a patch, or other driving surface) and to accurately determine the extent of the drivable space on the road relative to the unexpected objects. For example, in some cases, some objects (referred to as unexpected objects) can appear on a driving surface unexpectedly as a tracking vehicle is driving. As used herein, the term "unexpected object" refers to an object that a tracking object (e.g., a vehicle) is not aware of prior to detecting that object using one or more sensors. For instance, a vehicle can be aware of driving surfaces, routes, intersections, exits, places (e.g., gas stations, stores, etc.), etc. based on information to which the vehicle has access (e.g., map information stored locally by the vehicle or accessed from a remote source, such as via a wireless communication with one or more servers). Examples of such unexpected static objects include obstacles near a construction zone, obstacles that have fallen into a particular lane of the driving surface, among others.

The ability to detect and track objects around the vehicle can be especially important for higher levels of autonomy, such as autonomy levels 3 and higher. For example, autonomy level 0 requires full control from the driver as the vehicle has no autonomous driving system, and autonomy level 1 involves basic assistance features, such as cruise control, in which case the driver of the vehicle is in full control of the vehicle. Autonomy level 2 refers to semi-autonomous driving, where the vehicle can perform functions such as drive in a straight path, stay in a particular lane, control the distance from other vehicles in front of the vehicle, or other functions. Autonomy levels 3, 4, and 5 include more autonomy than levels 1 and 2. For example, autonomy level 3 refers to an on-board autonomous driving system that can take over all driving functions in certain situations, where the driver remains ready to take over at any time if needed. Autonomy level 4 refers to a fully autonomous experience without requiring a user's help, even in complicated driving situations (e.g., on highways and in heavy city traffic). With autonomy level 4, a person may still remain at the in the driver's seat behind the steering wheel. Vehicles operating at autonomy level 4 can communicate and inform other vehicles about upcoming maneuvers (e.g., a vehicle is changing lanes, making a turn, stopping, etc.). Autonomy level 5 vehicles full autonomous, self-driving vehicles that operate autonomously in all conditions. A human operator is not needed for the vehicle to take any action.

FIG. 1 is an image 100 illustrating a road 102 including static objects (including static object 104) and a vehicle 106 driving on a road 102. The vehicle 106 is an example of a dynamic object. In some cases, the image 100 can be captured by a tracking vehicle (not shown). The tracking vehicle can be an autonomous vehicle operating at a particular autonomy level. The tracking vehicle can track the vehicle 106 (as a target vehicle) and can attempt to autonomously navigate around the static objects. For example, the tracking vehicle can determine the position (and in some cases the size) of the static object 104. Based on the position of the static object 104, the tracking vehicle can determine when to slow down, speed up, change lanes, and/or perform some other function in order to avoid the static object 104.

Vehicles that are equipped with certain light-based sensors (e.g., a time-of-flight sensor, such as a LIDAR sensor) may be able to detect and track unexpected objects (e.g., static objects) with relative ease. For instance, a vehicle that includes one or more LIDAR sensors can detect the presence of unexpected objects in the road by emitting light signals and receiving reflections of the emitted light signals. The reflected signals can be processed in order to determine the location of the unexpected objects. However, it can be challenging for a tracking vehicle to detect unexpected objects when using image-based sensors, such as cameras, to detect and track objects. As noted above, accurately detecting and/or tracking unexpected objects (e.g., static objects) is an important feature of an autonomous vehicle, allowing the vehicle to make accurate motion planning and trajectory planning decisions relative to such objects.

Other types of systems can also benefit from detecting and/or tracking unexpected objects. For instance, robotics systems that perform operations on objects may need to be able to accurately detect and track unexpected objects. In one illustrative example, a robotics device used for cleaning (e.g., an autonomous vacuum cleaner) needs to be able to detect the presence and location of unexpected objects in an environment in order to avoid such objects when moving through the environment. In another illustrative example, a robotics device used for manufacturing needs to know an accurate location of unexpected objects in order to avoid accidents. In another illustrative example, an aviation system (e.g., unmanned aerial vehicles among others) can benefit from the accurate detection of unexpected objects in a flight path so that the aviation system can accurately navigate around the objects. Many other examples exist of systems that need to be able to identify the size and position of objects.

Systems, apparatuses, methods (also referred to as processes), and computer-readable media (collectively referred to as "systems and techniques") are described herein for performing static occupancy tracking to estimate the static occupancy of regions around a tracking object (e.g., whether one or more static objects occupy the regions). For example, a system configured to perform the techniques described herein can be included in a tracking object (e.g., a vehicle, a robotics system, etc.) that can detect and track one or more target objects. In some aspects, the systems and techniques can perform static occupancy grid tracking using various types of input information to determine and/or update probabilities for cells in a static occupancy grid that represents a physical three-dimensional (3D) space. The static occupancy grid can be used by the system to determine when certain portions of the 3D space are occupied by one or more objects (e.g., static objects, which can be unexpected objects). For instance, a system of an autonomous vehicle can determine when a portion of a driving surface (e.g., a road) is occupied by a static object (including unexpected static objects) based on the probabilities determined for cells of the grid that correspond to that portion of the driving surface. Aspects of the systems and techniques will be described using a vehicle (e.g., autonomous vehicle) as an example of a tracking object and a road as an example of a driving surface. However, the systems and techniques can be included in and/or used by any type of tracking object or system, such as a robotics system, an aviation system (e.g., an unmanned aerial vehicle), and/or other type of tracking object or system traveling or stationary on any type of driving surface. Further, while the systems and techniques are described with respect to static objects, the system and techniques can be used to detect and track dynamic objects in some cases.

In some aspects, the systems and techniques can estimate the static occupancy (and thus drivable regions) of regions in a 3D space around a tracking object (e.g., a tracking vehicle) using boundary information (which can also be referred to herein as drivable space boundary information) determined from images, information from a point map (e.g., an HD map), both the boundary information and the point map information, and/or using other information. The images can be captured by one or more cameras of the tracking object (e.g., tracking vehicle). For instance, the one or more cameras can be mounted on the tracking object (e.g., tracking vehicle) and can be pointed at or aimed in a particular direction (e.g., in a forward direction relative to the front of the tracking object, at an angle relative to the front of the tracking object, and/or in any other direction).

The boundary information can include navigable space boundaries indicating one or more boundaries of regions and/or objects in the images. Using a vehicle as an example of a tracking object, the boundary information can include drivable space boundaries indicating one or more boundaries in the images, such as boundaries of drivable regions in the space depicted in the images and/or boundaries of one or more static objects depicted in the images. For instance, for a given image or for a portion of the image, the boundary information can include a particular pixel (e.g., a lower-most pixel that is not free for driving) that is associated with a boundary of an object (e.g., an outer boundary of a lane of the road, a static object, etc.) depicted in the image.

In some cases, the boundary information can be determined from the images using one or more machine learning models. For instance, in some cases, a neural network based system (which can be referred to as a drivable space neural network (DSN)) can process the images to determine the boundary information. In some examples, each camera of the tracking object (e.g., the tracking vehicle) used to capture images can include a machine learning model (e.g., a DSN) that can be used to process the captured images and determine boundary information for those images. In some cases, the boundary information can be generated using one or more other types of neural network based systems. In one example, a deep learning model or algorithm can predict a drivable or non-drivable class label for every pixel in an image (in which case the deep learning algorithm detects the entire drivable region in the image, not just the boundary) or for a subset of pixels in the image. Given each image, once the systems and techniques identify the cell of the static occupancy grid corresponding to each pixel, the systems and techniques can update the probability of occupancy of those cells. In another example, a deep learning model or algorithm can estimate probabilities on the static occupancy grid in a top-view directly from the images. In such an example, the systems and techniques can combine the information from multiple images using a Bayesian filter (or other filter), as described herein. Any other suitable machine learning based technique can be used to determine or estimate the boundary information.

In some cases, the boundary information can be generated using a computer vision based technique or algorithm. For instance, a computer vision based technique can be used that performs temporal tracking to estimate the boundary or boundaries of regions in which an object can move (e.g., drivable regions) and/or the boundary or boundaries of one or more static objects depicted in the images.

As noted above, one or more machine learning models or systems (e.g., a DSN) can process one or more images to determine estimates of the drivable regions of a 3D space depicted in the one or more images. In some examples, for each column in an image, a machine learning model (e.g., a DSN or other machine learning model) or other system can predict a position (e.g., a row) of a lower-most pixel (referred to as a boundary pixel or delimiter) that is not free for driving (e.g., because the pixel is associated with a portion of a boundary of an object in the image). The machine learning model can be configured to perform the boundary pixel prediction as a regression task, as a multi-class classification task (e.g., detecting the index of the boundary column about all the candidates, such as the set of all row indices), with optional post-processing to estimate the boundary at sub-pixel resolution, and/or using another suitable task. Each column in the image can be a column of pixels in the image, such as a column that is 1 pixel wide. In some examples, as noted above, a deep learning neural network can be used to predict a drivable or non-drivable class label for every pixel in an image (instead of specifically determining boundary information).

In some cases, the machine learning model or other system can also predict whether the boundary pixel belongs to a boundary of a static object (e.g., a traffic cone in the road) or a dynamic object (e.g., a vehicle traveling along the road). In some examples, the machine learning model can include a classification neural network for performing a classification task to determine an object class at the boundary. For instance, the classification neural network can determine a first class for boundary pixels that belong to a boundary of a static object and a second class for boundary pixels that belong to a boundary of a dynamic object. In one illustrative example, the machine learning model can include a classification convolutional neural network (CNN) for predicting the boundary pixel position and for classifying the boundary pixel (e.g., as belonging to a static or dynamic object). Post-processing can be applied in some cases for estimating the boundary at a sub-pixel level. In some implementations, the machine learning model (e.g., the classification CNN) can predict soft scores for both prediction outputs. In some implementations, the soft scores can be interpreted as a probability for the static occupancy grid.

As noted above, a machine learning model or system can classify a boundary pixel as belonging to a boundary of a static object or a boundary of a dynamic object. When computing probabilities for updating the static occupancy grid, the columns with a boundary pixel belonging to a dynamic object may be treated differently than columns with a boundary pixel belonging to a static object. The probabilities for the static occupancy grid can be determined and/or updated for boundary pixels belonging to static objects based on a representative probability for certain cells corresponding to the boundary pixel (e.g., based on a projection of the boundary pixel to the road or other object surface). For dynamic boundaries, it can be determined that a surface (e.g., a road) is clear up to the boundary. It may not be known whether there is a static object at or beyond the dynamic boundary. In such cases, when the static occupancy grid is updated with new probabilities (e.g., for a given frame), a low probability can be assigned to cells up to the dynamic boundary and a prior probability value can be assigned to cells beyond the boundary. In some cases, to account for pixel noise in the boundary estimate, probabilities for the static occupancy grid can be updated with a smoothened version of the probability values (e.g., using a Gaussian model).

The one or more machine learning models or systems can output a boundary pixel (or a position for a boundary pixel) and/or a classification for each boundary pixel (e.g., as belonging to a boundary of a static object or a dynamic object) for each column in an image, such as a first boundary pixel for a first column in an image, a second boundary pixel for a second column in the image, and so on. As described below, the boundary pixels can be used to determine a probability of occupancy for regions of the surface (e.g., the road) upon which the tracking object (e.g., the tracking vehicle) is traveling.

The point map can include a plurality of map points corresponding to one or more reference locations in the 3D space. In some cases, the point map can include dimensional information for objects in the 3D space and other semantic information associated with the 3D space. For instance, the information from the point map can include height information (e.g., road height), normal information (e.g., road normal), and/or other semantic information related to a portion (e.g., the road) of the 3D space in which the tracking object (e.g., the tracking vehicle) is navigating. The point map information can also be used to determine a probability of occupancy for regions of the surface (e.g., road) upon which the tracking object (e.g., the tracking vehicle) is traveling.

As noted above, the systems and techniques can determine the probability of occupancy of regions around the tracking object (e.g., the tracking vehicle) using the boundary information and the point map information as input. For instance, the systems and techniques can use a sequence of outputs (including boundary information) from the machine learning model(s), such as a sequence of DSN outputs from the one or more cameras on the tracking object (e.g., the tracking vehicle). In some aspects, the systems and techniques can utilize an inverse sensor model that maps the boundary information output from the one or more machine learning models to probabilities of occupancy for positions on the surface (e.g., the road). As previously noted, in some cases, the systems and techniques can use an occupancy grid tracking framework to track the probabilities of occupancies of all cells in a grid of cells around the tracking object (e.g., the tracking vehicle). When determining the probabilities, the point map information can be used to determine whether a given cell of the grid is on the surface (e.g., the road) or off of the surface (e.g., the road), to determine a dimension (e.g., a height) of the surface (e.g., the road) at a given cell position or a height of the surface (e.g., the road) nearest a cell position that is off of the surface (e.g., the road), and/or to determine other information for the occupancy grid.

Aspects of the techniques and systems will be described with respect to the figures. While some examples are described herein using vehicles (e.g., autonomous vehicles) and/or autonomous driving systems for illustrative purposes, one of ordinary skill will appreciate the systems and related techniques described herein can be included in and performed by any other system or device.

Figure 2:
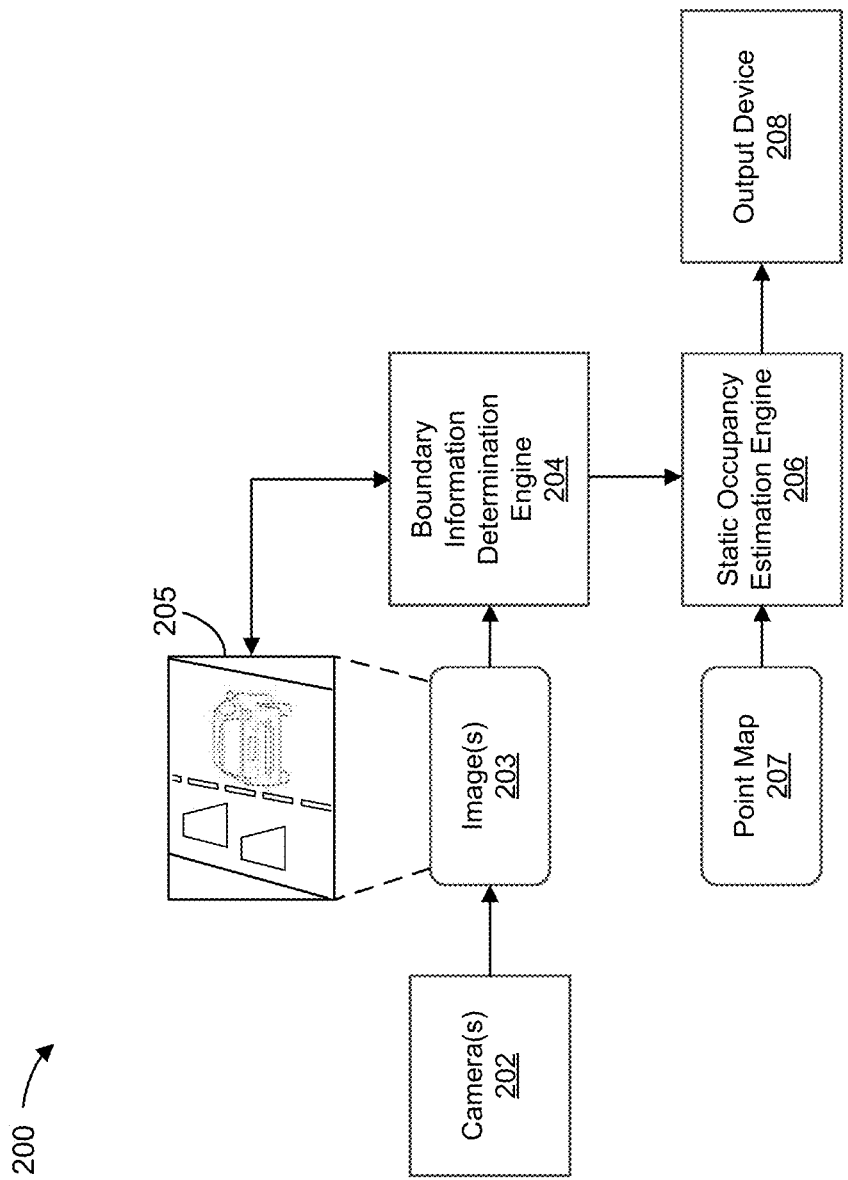
FIG. 2 is a block diagram illustrating an example of a system for performing occupancy tracking, in accordance with some examples.

FIG. 2 is a block diagram illustrating an example of a system 200 for performing occupancy tracking in a three-dimensional (3D) space or environment through which the system 200 travels. For instance, the system can perform static occupancy grid tracking to estimate the static occupancy of regions around a tracking object that includes the system 200. The static occupancy can indicate to the tracking object whether one or more unexpected static objects occupy the regions. The system 200 can be included in a tracking object that tracks one or more target objects. As noted above, a tracking object refers to an object that detects and tracks one or more other objects, which can be referred to as target objects. In one illustrative example, the system 200 can include an autonomous driving system included in an autonomous vehicle (as an example of a tracking object). In other illustrative examples, the system 200 can include an autonomous navigation system included in a robotics device or system, in an aviation system (e.g., of an unmanned aerial vehicle, etc.), or in another device. As noted, while some examples are described herein using vehicles (e.g., autonomous vehicles) and/or autonomous driving systems for illustrative purposes, the system 200 and related techniques described herein can be included in and performed by any other system or device.

The system 200 includes various components, including one or more cameras 202, a boundary information determination engine 204, a static occupancy estimation engine 206, and an output engine 208. The components of the system 200 can include software, hardware, or both. For example, in some implementations, the components of the system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the system 200.

While the system 200 is shown to include certain components, one of ordinary skill will appreciate that the system 200 can include more or fewer components than those shown in FIG. 2. For example, the system 200 can include, or can be part of a computing device or object that includes, one or more input devices and one or more output devices (not shown). In some implementations, the system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the system 200 can be implemented by and/or included in a computing device or other object. In some cases, multiple computing devices can be used to implement the system 200. For example, a computing device used to implement the system 200 can include a computer or multiple computers that are part of a device or object, such as a vehicle, a robotic device, a surveillance system, and/or any other computing device or object with the resource capabilities to perform the techniques described herein. In some implementations, the system 200 can be integrated with (e.g., integrated into the software, added as one or more plug-ins, included as one or more library functions, or otherwise integrated with) one or more software applications, such as an autonomous driving or navigation software application or suite of software applications. The one or more software applications can be installed on the computing device or object implementing the system 200.

The one or more cameras 202 of the system 200 can capture one or more images 203. In some cases, the one or more cameras 202 can include multiple cameras. For example, the one or more cameras 202 can be part of an autonomous vehicle including the system 200 and can include a camera or multiple cameras on the front of the vehicle, a camera or multiple cameras on the back of the vehicle, a camera or multiple cameras on each side of the vehicle, and/or other cameras. In some cases, the one or more cameras 202 can include front-facing cameras of an autonomous vehicle. In another example, a robotic device including the system 200 can include multiple cameras on various parts of the robotics device. In another example, aviation device including the system 200 can include multiple cameras on different parts of the aviation device. In some examples, the one or more cameras 202 can include the boundary information determination engine 204. For instance, the one or more cameras 202 can include hardware and software components that can implement the boundary information determination engine 204.

The one or more images 203 can include still images or video frames. The one or more images 203 each contain images of a 3D space or environment. An example image 205 is shown in FIG. 2. The image 205 illustrates an example of an image captured by a camera (from the one or more cameras 202) of a tracking vehicle, including a target vehicle and multiple static objects (e.g., cones in a lane of a road). When the one or more images 203 include video frames, the video frames can be part of one or more video sequences. In some cases, the images captured by the one or more cameras 202 can be stored in a storage device (not shown), and the one or more images 203 can be retrieved or otherwise obtained from the storage device. The one or more images 203 may include one or more two-dimensional representations of the 3D space along one or more planes (e.g., a plane in a horizontal or x-direction and a plane in a vertical or y-direction), or one or more three dimensional representations of the 3D space. For instance, the one or more images 203 can be color images composed of pixels (e.g., red-green-blue (RGB) images with red, green, and blue color components per pixel), monochrome images, depth images or depth maps, images with color and depth information (e.g., RGB-depth or RGB-D images), vector images composed of vectors or polygons, a combination thereof, and/or other types of images.

The boundary information determination engine 204 can obtain and process the one or more images 203 to determine boundary information for the one or more images 203. In some aspects, multiple boundary information determination engines can be used by the system. As noted above, the one or more cameras 202 can include the boundary information determination engine 204 in some cases. For instance, in such cases, each camera can include a boundary determination engine that can process the images captured by the camera and can determine boundary information for the images captured by the camera. In some cases, the boundary information determination engine 204 can be a separate component from the one or more cameras 202, and can process images captured by some or all of the one or more cameras 202.

In some cases, the boundary information determination engine 204 can include one or more machine learning models or systems. In one illustrative example, the boundary information determination engine 204 can include a neural network based system (e.g., a deep learning neural network) that can be referred to as a drivable space neural network (DSN). The DSN can process the images to determine the boundary information. As noted above, the machine learning model or system can include a classification convolutional neural network (CNN). Examples of deep learning networks are described below with respect to FIG. 15 and FIG. 16. In some examples, the boundary information determination engine 204 can implement a computer vision algorithm or technique to determine the boundary information. In one example, the computer vision algorithm or technique can perform temporal tracking to estimate the boundary or boundaries of regions in which an object can move (e.g., drivable regions) and/or the boundary or boundaries of one or more static objects depicted in the images.

As noted previously, the boundary information determined by the boundary information determination engine 204 can include drivable space boundaries for each image. The drivable space boundaries indicate one or more boundaries of a scene depicted in an image, such as boundaries associated with lanes of a road depicted in the image, boundaries of one or more static objects depicted in the image, and/or other boundaries associated with the scene in the image. In some cases, the boundary information can include a particular pixel in an image that is associated with a boundary of an object depicted in the image. For instance, the boundary information determination engine 204 can determine a lower-most pixel that is not free for driving. The lower-most pixel can be used as a boundary pixel due to that portion of the boundary of a static object likely being the first point a tracking object would encounter based on the direction of travel (e.g., when the images are from cameras on the front of the tracking object). It can be assumed that the road is clear up to the boundary pixel. In some cases, the boundary information determination engine 204 can determine and output the row identifier (ID) of the first row (relative to the bottom of the image) of a given column that is not drivable (e.g., because the portion of the space corresponding to the pixel in that row and column of the image is occupied by a static object). In some cases, the boundary information determination engine 204 can determine and output the boundary position at sub-pixel resolution. For instance, a row output value of 2.6 can refer to a position between row 2 (a second row of pixels) and row 3 (a third row of pixels) in an image. In examples when the boundary information determination engine 204 is implemented using a machine learning model or system, the sub-pixel information can be determined by performing post-processing on the machine learning output.

Figure 3:
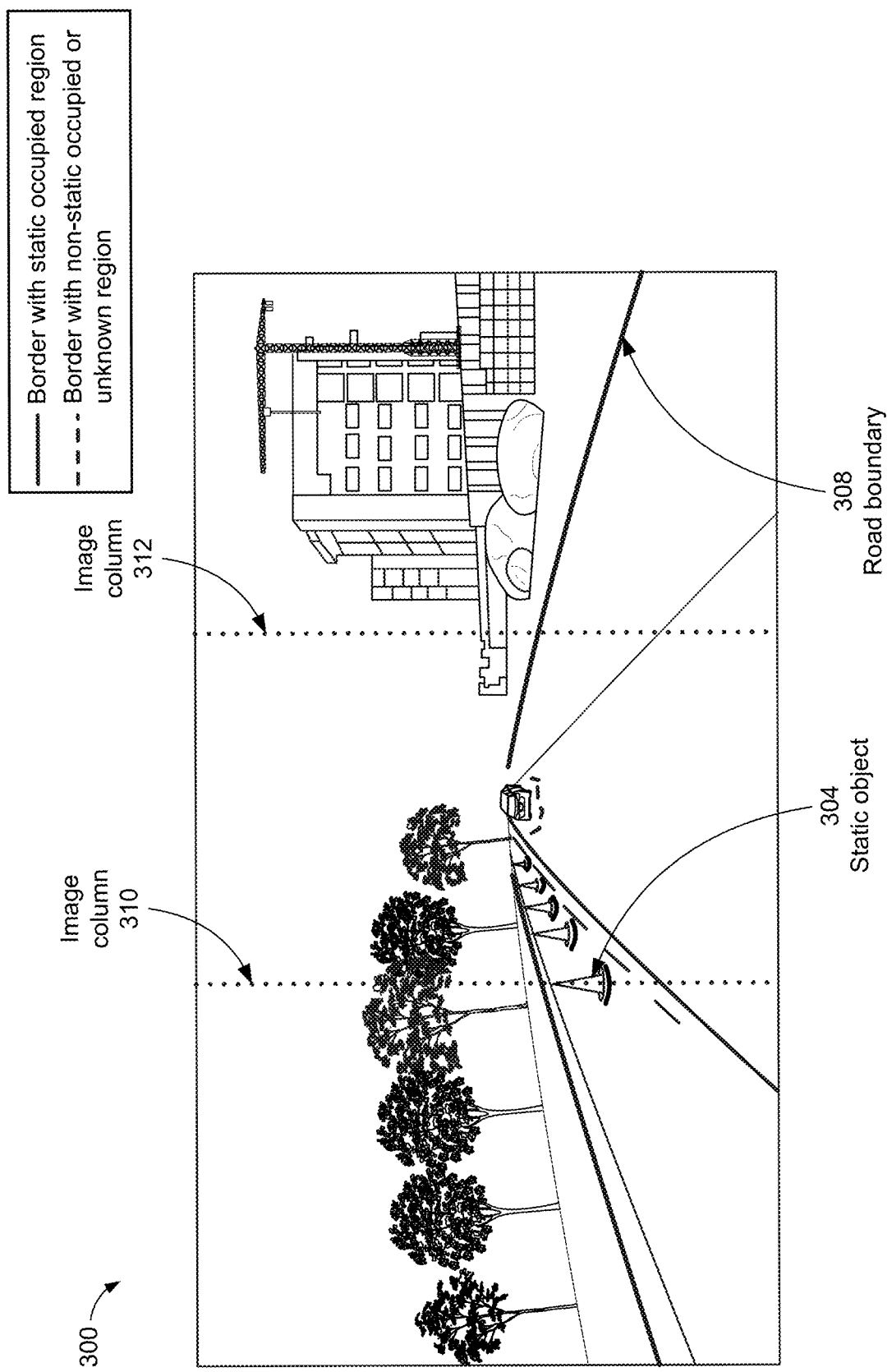
FIG. 3 is an image with annotations illustrating example boundary information, in accordance with some examples.

FIG. 3 is an image 300 with annotations illustrating example boundary information that can be output by the boundary information determination engine 204. The annotations are shown in a solid outline and a dashed outline. The solid outline indicates a border of a static occupied region (a region occupied by a static object or non-drivable region outside the road such as a sidewalk). The dashed outline indicates a border of non-static (or dynamic) occupied region or an unknown region. The boundary information determination engine 204 can process each column in the image 300. In some cases, each image column can include a single column of pixels that is 1 pixel wide. Starting from the bottom of the image 300, the boundary information determination engine 204 can determine the position of the first non-drivable pixel (referred to as a boundary pixel or delimiter) for each column of the image 300. For example, the boundary information determination engine 204 can determine that a pixel corresponding to the bottom of a static object 304 is a bottom-most (or first from the bottom of the image 300) non-drivable pixel in the image column 310. In another example, the boundary information determination engine 204 can determine that a pixel corresponding to the road boundary 308 is a bottom-most non-drivable pixel in the image column 312. A similar determination can be made for every column in the image 300, resulting in a boundary pixel being determined for every column in the image.

In some examples, the boundary information determination engine 204 can also determine whether each boundary pixel is part of a boundary of a static object or a dynamic object (e.g., a vehicle moving on the road). In some cases, the boundary information determination engine 204 can add a label to the boundary information output indicating whether each boundary pixel is a boundary of a static object or dynamic object.

The static occupancy engine 206 can obtain as input one or more outputs (e.g., a stream of multiple outputs based on multiple images) from the boundary information determination engine 204 and information from a point map 207. The point map 207 can include a plurality of map points corresponding to one or more reference locations in the 3D space. The point map 207 can be referred to in some cases as a high-definition (HD) map. In one example using autonomous vehicles as an illustrative example of objects, the points of the point map 207 define stationary physical reference locations related to roadways, such as road lanes and/or other data. For example, the point map 207 can represent lanes on the road as a connected set of points. Line segments are defined between two map points, where multiple line segments define the different lines of the lanes (e.g., boundary lines and center lines of a lane). The line segments can make up a piece-wise linear curve defined using the map points. For example, the connected set of points (or segments) can represent the center lines and the boundary lines of a lane on a road, which allow an autonomous vehicle to determine where it is located on the road and where target objects are located on the road. In some cases, different point maps can be maintained for different areas of the world (e.g., a point map for New York City, a point map for San Francisco, a point map for New Orleans, and so on). In some examples, the different point maps can be included in separate data files (e.g., Geo-JavaScript Object Notation (GeoJSON) files, ShapeFiles, comma-separated values (CSV) files, and/or other files).

In some cases, the point map 207 can include semantic information for objects in the 3D space. For instance, the point map 207 can include information such as road height and road normal for different portions of a road. In one example, the point map 207 can include a road height value and a road normal value at various queried 2D points. For instance, a map API of the point map 207 (e.g., an HD map API) can support query points whose two top view coordinates are specified in a frame of reference of the point map 207. For instance, given x- and y-coordinates, the map API can return the z-coordinate of the point on the map with the specified x- and y-coordinates. The map can be queried using the map API with points on the ay plane of a static occupancy grid (discussed below). The API can be used to calculate the height of the road at each grid cell of the static occupancy grid. When processing points on the grid or on the grid plane (e.g., along the ray where the plane corresponding to the image column intersects the ground plane, as described below), the API can be used to determine the height of the points.

The static occupancy engine 206 can determine a probability of occupancy for regions around the system 200 (e.g., around a vehicle including the system 200) using the boundary information and the information from the point map 207. As described in more detail below, the static occupancy engine 206 can implement an inverse sensor model that maps the boundary information output from the boundary information determination engine 204 to probabilities of occupancy for positions on a portion of the 3D space (e.g., positions along the road upon which a tracking vehicle travels).

In some examples, the static occupancy engine 206 can use an occupancy grid tracking framework to track the probabilities of occupancies of all cells in a grid of cells around the vehicle. The grid of cells can be referred to as a static occupancy grid (SOG). In some cases, the static occupancy engine 206 can use the point map information to determine whether a given cell of the static occupancy grid is on the road or off the road, to determine a dimension (e.g., a height, a normal, etc.) of the road at a given cell position or a height of the road nearest a cell position that is off of the road, and/or to determine other information for the occupancy grid. The static occupancy grid can be used by the system 200 to determine when certain portions of a 3D space are occupied by static objects. For instance, the system 200 can determine when a portion of a road is occupied by a static object based on the probabilities determined for cells of the grid that correspond to that portion of the road.

Figure 4:
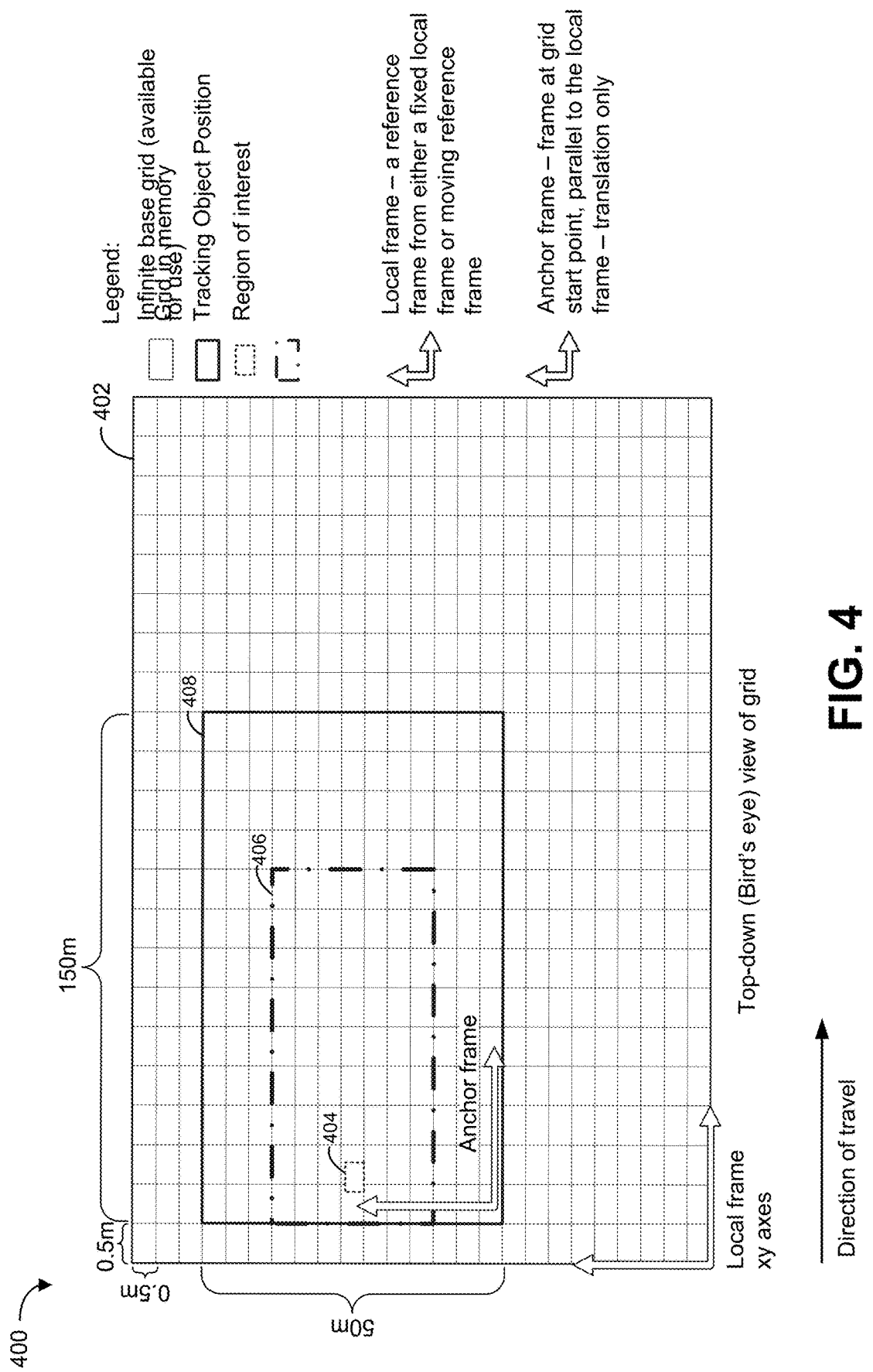
FIG. 4 is a diagram illustrating an example of a static occupancy grid including a plurality of cells, in accordance with some examples.

FIG. 4 is a diagram illustrating an example of a static occupancy grid 400 including a plurality of cells (including cell 402). The static occupancy grid 400 is a top-down view relative to a tracking object 404 (e.g., a tracking vehicle). The cells in the grid 400 can have a uniform size. For instance, the dimension of each cell can be 50 cm×50 cm (as shown in FIG. 4). The cell dimensions can be based on the resolution required for the particular application for which the static occupancy grid 400 is used. In some cases, the position of the tracking object 404 can be from the perspective of a position of a camera on the tracking object 404. The direction of travel of the tracking object 404 is from left to right in FIG. 4 (as shown by the arrow labeled "direction of travel").

The static occupancy engine 206 can use the static occupancy grid 400 to predict a probability that each location around the tracking object 404 is occupied by one or more static objects. For instance, the static occupancy engine 206 can determine the probability that a region around the tracking object 404 is occupied. The static occupancy engine 206 can maintain a certain number of grid cells (denoted as region 408) around the vehicle in memory. As an illustrative example, the region 408 can be 50 meters wide and 150 meters long, as illustrated in FIG. 4. The static occupancy engine 206 can determine and track probabilities for all cells in the region 408. For instance, in some cases, the static occupancy engine 206 may only update cells whose probabilities are currently tracked by the system (e.g., the cells in the region 408). A region of interest 406 around the vehicle can include the actual grid limits of interest to downstream components (e.g., the output engine 208 and/or other components). In some cases, the static occupancy engine 206 can determine and track probabilities for all cells in the region 408 (as noted above), but may provide the probabilities for the cells in the region of interest 406 to the output engine 208. In some cases, the static occupancy engine 206 can provide the probabilities for the cells in the entire region 408 to the output engine 208. The region 408 provides a buffer zone so that probabilities for the cells in the region 408 can be maintained instead of the cells only in the region of interest 406. Providing a larger region 408 of cells than the region of interest 406 can limit expensive memory operations (e.g., moving data in and out of memory). In some alternative cases, only the cells in the region of interest 406 are maintained with probabilities.

As noted above, the region of interest 406 can include the cells of the static occupancy grid 400 that are of interest to downstream components, which can include the output engine 208 and/or other components of the system 200 or a larger system or device (e.g., a vehicle, a robotics system, or other system or device) including the system 200. In some examples, as described in more detail below, the output engine 208 can determine certain behaviors to perform. For instance, the output engine 208 can determine a behavior (e.g., lane change, in-lane maneuver, hard brake, etc.) for the tracking object 404 to take given the current state of the environment. The output engine 208 can also include a motion planning component that plans a route that the tracking object 404 should take to implement the determined behavior. In some cases, the output engine 208 can use probabilities of cells that are within the region of interest 406 when determining such behaviors and motion.

As the tracking object 404 moves, the static occupancy engine 206 can update the cells in region 408 that are maintained in memory (which also includes the cells in the region of interest 406 for which probabilities are provided to the output engine 208). For instance, as the tracking object 404 moves, the region 408 and the region of interest 406 also move with the tracking object 404 and probabilities are determined for the cells within the updated region 408. For example, as the tracking object 404 moves, if a cell goes outside of the region 408, the static occupancy engine 206 can drop the estimated probability for that cell and can begin determining estimated probabilities for new cells that come into the region 408. In some examples, when the tracking object 404 is yawed at certain angles (e.g., at 45 degrees) with respect to the orientation of the static occupancy grid 400, the region of interest 406 will be yawed with respect to the grid orientation, and the larger region 408 will continue to be an axis-aligned rectangular region.

The static occupancy engine 206 can match the position of each cell in the static occupancy grid with a corresponding position in the point map 207. Using the corresponding positions on the point map 207, the static occupancy engine 206 can associate each tracked cell (e.g., within region 408 of FIG. 4) with a flag or other indicator that indicates whether each cell is within or on a particular portion of the 3D space or outside of the portion of the 3D space. In one illustrative example, a flag can indicate whether a cell is on a road or off the road. In some cases, the static occupancy engine 206 can also associate each cell with the height of the portion of the 3D space (e.g., the height of the road) at the cell location or at a position (e.g., the road position) nearest to the cell in the event the cell is not within the portion of the 3D space (e.g., the cell is off the road). In some cases when the point map 207 is not available (e.g., due to poor or no wireless network performance, due to no access to the point map 207, etc.), the height may be approximated by modeling the portion of the 3D space (e.g., the road surface) as a flat plane at the ground plane of the tracking object (e.g., tracking vehicle) location.

As noted previously, the static occupancy engine 206 can implement an inverse sensor model. The inverse sensor model maps the boundary information received from the boundary information determination engine 204 to probabilities of occupancy for certain cells in the static occupancy grid (e.g., cells in the region 408 of FIG. 4). The inverse sensor model and Bayes tracking will be described using a road as an example of the portion of the 3D space for which the static occupancy grid is associated. In general, occupancy tracked for a cell in the static occupancy grid represents the occupancy of points on the road surface whose orthogonal projections lie in the cell. In some cases, a goal of the static occupancy engine 206 is to determine a probability that some point within cell is occupied (not necessarily all points in the cell and not a random point). The static occupancy engine 206 can use the structure of the road surface (determined from the point map 207) and the boundary points (or delimiters) to determine probabilities for the cells of the static occupancy grid. The inverse sensor model used in the Bayes filtering framework can update cells along a direction of each column in the image.

Figure 5A:
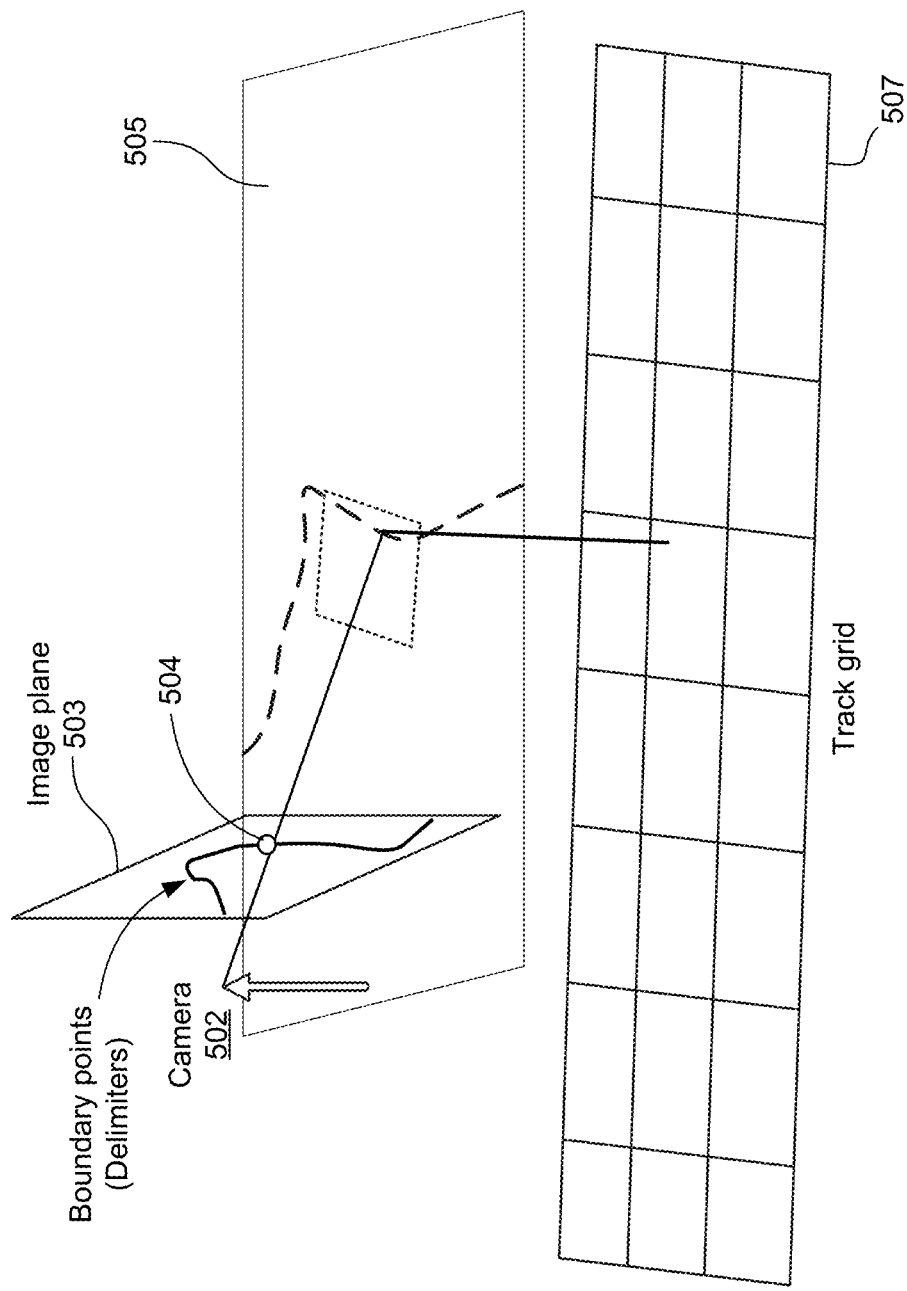
FIG. 5A and FIG. 5B are diagrams illustrating example aspects of an inverse sensor model, in accordance with some examples.
Figure 5B:
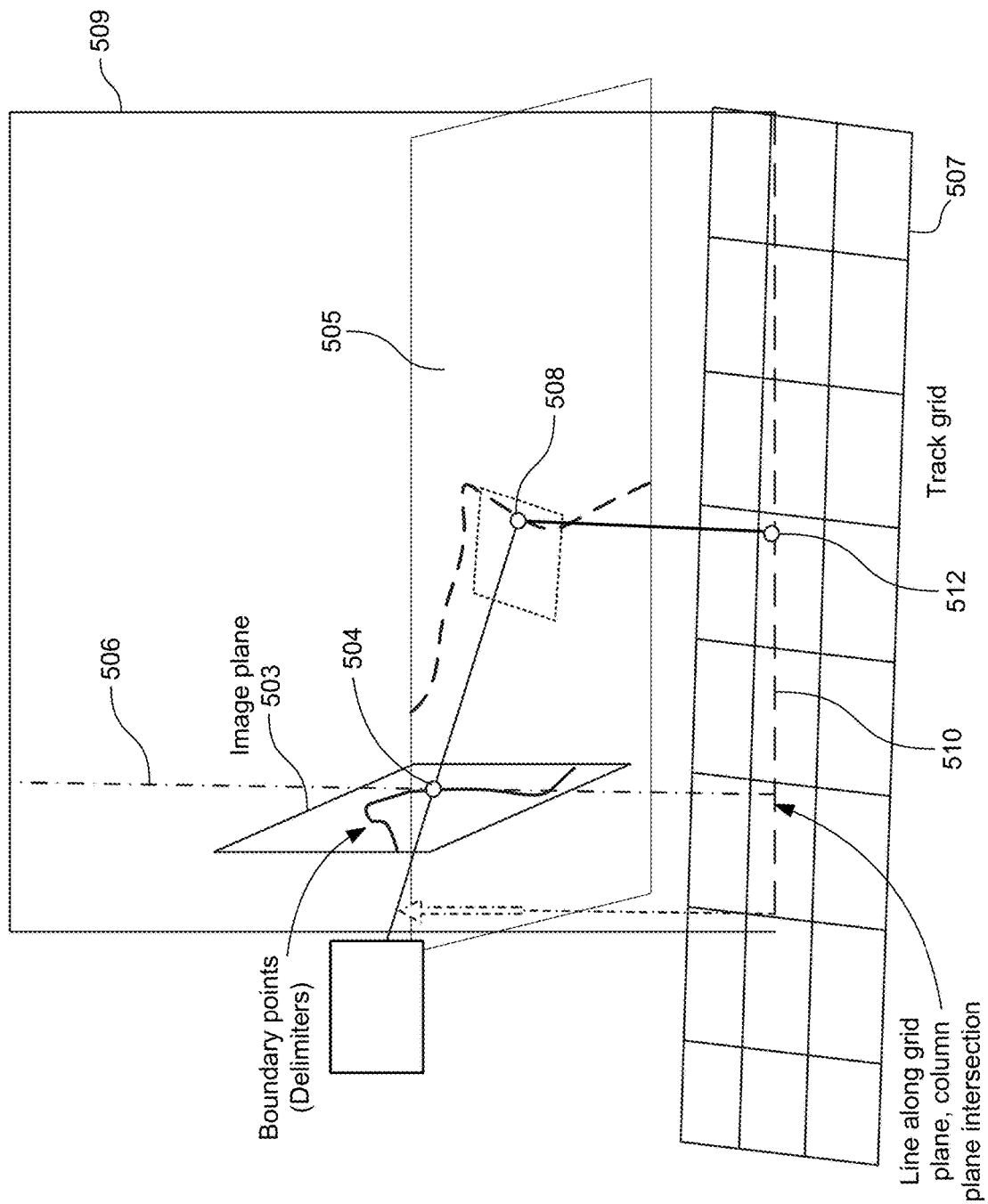
Figure 6:
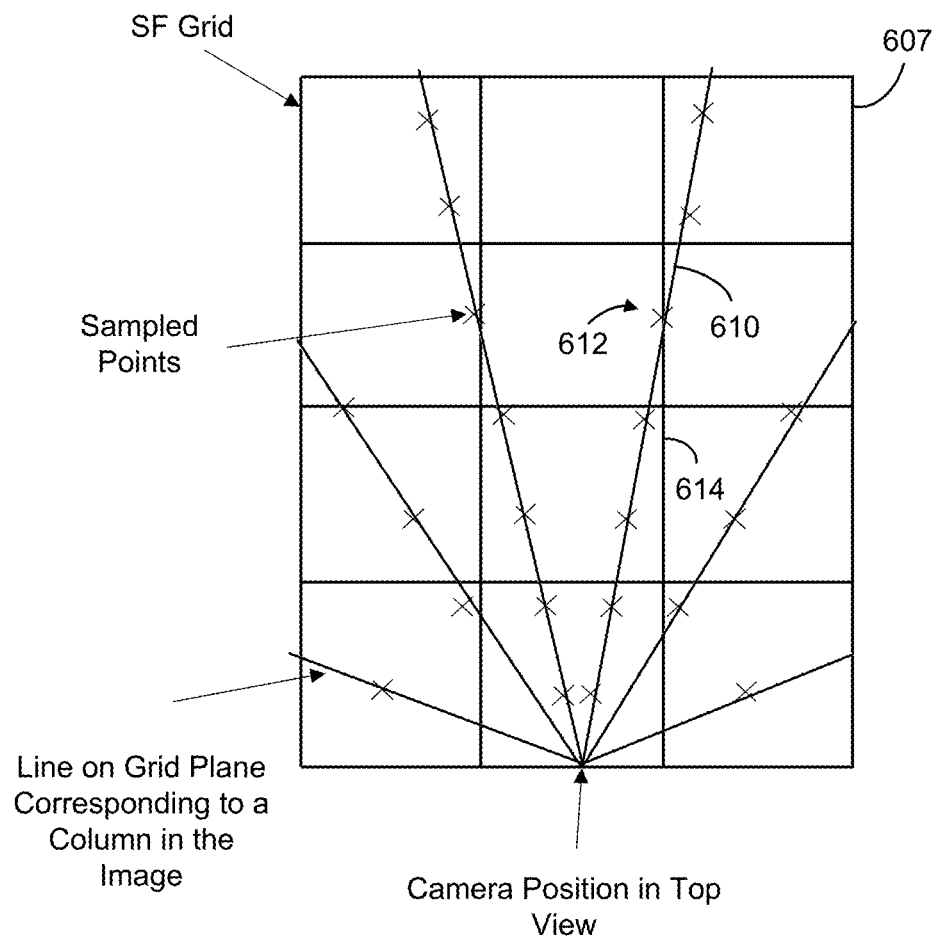
FIG. 6 is a diagram illustrating an example of a grid with multiple rays or lines projected along the grid, in accordance with some examples.

FIG. 5A, FIG. 5B, and FIG. 6 are diagrams illustrating example aspects of the inverse sensor model. In FIG. 5A and FIG. 5B, a camera 502 is illustrated that can capture an image or multiple images. An image captured by the camera 502 is represented by an image plane 503 and the ground is represented by a ground plane 505. The tracked grid 507 is also shown, which can correspond to region 408 in FIG. 4. The boundary information determination engine 204 can process the image (e.g., using a DSN) to determine boundary points (or delimiters) for each column of the image, including boundary point 504 (or delimiter) for a column 506. To implement the inverse sensor model for a given image, the static occupancy engine 206 can first identify a point 508 on the ground corresponding to the boundary point 504 for the column 506 of the image. In some cases, the static occupancy engine 206 can determine the point 508 using the height and/or road normal from the point map 207. The point 508 on the ground corresponds to a corresponding point 512 on the grid 507. The point 512 can be determined by expressing the point 508 in the frame of reference of the grid 400. For example, the 3D position of the point 508 and the exact position of the grid are known, in which case the static occupancy engine 206 can compute the cell to which the point 508 will be mapped.

For a given column in the image and a given boundary point in that column (e.g., point 504), the inverse sensor model can predict a probability of occupancy along the line of intersection of the grid plane and a plane corresponding to the column. The plane 509 is a plane from the camera origin through the column 506. For instance, for the column 506 of the image, the static occupancy engine 206 projects a ray 510 onto the surface of the grid 507, which when projected onto the image plane 503 would align with the column 506 of the image. As shown in FIG. 5B, the ray 510 is the bottom portion of the plane 509 from the camera origin through the column 506. The inverse sensor model can take into account the fact that the road is not flat and can use correct road surface height (as determined from the point map 207) at each point.

For each camera image, the static occupancy engine 206 can then compute the posterior probability of occupancy for each point (or for a subset of points) of the grid 507 along the ray 510 using a Bayesian approach. For instance, the first non-drivable static point along the ray 510 can be assumed to have a uniform prior probability distribution along the ray up to a maximum feasible range (e.g., a range of 160 m). It can also be assumed that, given the position of the first static point along the ray 510, the likelihood for observing the boundary point (or delimiter) at a specific position on the image is distributed as a Gaussian random variable with mean equal to the perspective projection of the point onto the image plane and standard deviation equal to the amount of pixel noise that is expected (e.g., 2 pixels). In some cases, it can also be assumed that, given the position of the first static point along the ray 510, the probability that any position between the camera and the first static point is occupied is equal to zero, the probability of all points that are more than 0.5 meters (m) beyond the first point is equal to the prior probability (discussed below), and that the probabilities for points just behind the first point is equal to a probability close to the probability of the first point and decaying gradually to the prior probability beyond the first point. Based on these assumptions, the static occupancy engine 206 can compute the posterior probability of occupancy of each position along the ray 510. The Bayesian tracking framework is described in more detail below. For each camera frame, the static occupancy engine 206 can estimate the posterior probability of a cell along the ray 510 as a function of (e.g., based on a representative value or representative probability, such as a maximum probability, a mean or average probability, or other function) the probabilities of all points on all rays that pass through the cell.

FIG. 6 is a diagram illustrating an example of a grid 607 with multiple rays or lines projected along the grid 607. As noted above, each column of the image defines a plane, and each such plane intersects with the grid plane on a line or ray. Each ray or line shown in FIG. 6 thus corresponds to a line of a plane (e.g., plane 509) from the camera origin through a respective column (e.g., column 506) in the image. For a given column, probabilities along the corresponding line on the grid plane are updated using the bounding point or delimiter reading from the column. Each line or ray can be sampled at multiple points within the grid 607. For instance, as shown in FIG. 6, probabilities are determined for multiple points (each point being represented with an X) along each line, including point 612 along line 610. As noted above, the static occupancy engine 206 can estimate the probability of a cell along a line or ray as a function of the probabilities of all points on all rays that pass through the cell. For instance, the cell 614 can be updated with a representative probability (e.g., a maximum probability, a mean probability, or other representative probability) of all probabilities of the four sample points that are within the cell 614. After combining information across all frames, the static occupancy engine 206 can obtain a final inverse sensor model that predicts probabilities of occupancy for all cells given the outputs from the boundary information determination engine 204 for individual images.

As noted above, the static occupancy engine 206 can track the probabilities of static occupancy for the cells (e.g., in the region 408) over time using a Bayes filtering framework to update cells of the static occupancy grid as observations (boundary measurements) are received. While a Bayes filtering framework is described herein, other filtering or update mechanisms can be used to track the probabilities for the static occupancy grid. In some cases, the Bayes filtering framework can model the static occupancy of each cell as an independent random binary variable (e.g., it does not evolve with time, no process model, etc.). For instance, the probability of static occupancy for each cell c (conditional on past observations) can be represented as follows:

$$P(X_c=1|Y_{1:t}) \quad \text{Equation (1)}$$

where $X_c$ is the state of the cell c and includes a binary variable, either one or zero. If the state value of $X_c$ is one, then the cell c is considered to be occupied by a static object. The term $Y_{1:t}$ represents the observations up until time t, with an observation Y being an output (including boundary information) of the boundary information determination engine 204 for a given image. In some examples, the update performed for each cell by the Bayes filtering framework can be performed on an image-by-image basis. For instance, as the boundary information for each image is received, the static occupancy engine 206 can update the cells that are maintained in memory (e.g., the cells within the region 408 of FIG. 4).

In some cases, the Bayes tracking framework can track the log odds ratio for each cell c. The log odds ratio is the log of the probability divided by one minus the probability. For instance, the log odds ratio for a given cell c can be represented as follows:

$$\ell_t(x_c) \triangleq \log\frac{P(X_c=1|Y_{1:t})}{1-P(X_c=1|Y_{1:t})} = \log\frac{P(X_c=1|Y_{1:t})}{P(X_c=0|Y_{1:t})} \quad \text{Equation (2)}$$

As described above, using the inverse sensor model, the static occupancy engine 206 can perform updates for the cells in the static occupancy grid as boundary information for each image is received. The probabilistic tracking can be represented as follows (where a probability of static occupancy $P(X_c=1|Y_t)$ is determined using the inverse sensor model applied on a single observation at a current time t):

$$\ell_t(x_c) = \log\frac{P(X_c=1|Y_t)}{1-P(X_c=1|Y_t)} - \log\frac{P(X_c=1)}{1-P(X_c=1)} + \ell_{t-1}(x_c) \quad \text{Equation (3)}$$

where the term $$\log\frac{P(X_c=1|Y_t)}{1-P(X_c=1|Y_t)}$$

represents the probability (represented as a log odds ratio) determined using the inverse sensor model for the observation or measurement (including a boundary point) received for a current image at time t, the term $$\log\frac{P(X_c=1)}{1-P(X_c=1)}$$

represents a prior probability of occupancy (referred to as a prior), and the term $\ell_{t-1}(x_c)$ represents the estimated probability (as a log odds ratio) for a given cell c up until time t-1 (corresponding to the time prior to time t).

The prior is used in Equation (3) as a comparison to the current probability $$\log\frac{P(X_c=1|Y_t)}{1-P(X_c=1|Y_t)}$$

for time t. Based on the comparison between the current probability (for time t) and the prior, the static occupancy estimation engine 206 can determine whether to update the estimated probability $\ell_{t-1}(x_c)$ determined up until time t-1. For instance, if the comparison between current probability for time t indicates that the cell has the same probability as the prior, then the estimated probability $\ell_{t-1}(x_c)$ would not be updated (due to the left side of Equation (3) being equal to 0). If the current probability for time t is greater than the prior, the estimated probability $\ell t(x_c)$ for time t would increase relative to the estimated probability $\ell t-1(x_c)$. If the current probability for time t is less than the prior, the estimated probability $\ell t(x_c)$ for time t would decrease relative to the estimated probability $\ell_{t-1}(x_c)$.

In addition to using the prior during the update (performed using equation (3)), the probability for a cell can be initialized using the prior which is shown as follows:

$$\ell_0(x_c) = \log\frac{P(X_c=1)}{1-P(X_c=1)} \quad \text{Equation (4)}$$

For instance, in some examples, the probabilities for the cells of the static occupancy grid can be initialized to a value of the prior. In some examples, the value of the prior can be uniform for all cells in the grid. In some examples, the prior can include different values based on information from the point map 207. For instance, as noted above, the point map 207 can be used by the static occupancy engine 206 to match a position of each cell in the static occupancy grid with a corresponding position in the point map 207. The point map 207 indicates where roads and other objects are in the 3D space. Using the corresponding positions on the point map 207, the static occupancy engine 206 can associate each tracked cell (e.g., within region 408 of FIG. 4) with an indicator (e.g., a flag) that indicates whether each cell is on a road in the 3D space or outside of the road. In some cases, the prior can be set to a high value (e.g., a value of 0.5 indicating a high probability of occupancy) for cells outside of the road, and can be set to a low value (e.g., a value of 0.01 indicating a low probability of occupancy) for cells on the road. As outputs from the boundary information determination engine 204 for each image (from the one or more images 203) are received by the static occupancy engine 206, the static occupancy engine 206 can update the probabilities of occupancies using the Bayes filtering framework. For each update using the Bayes filtering framework, the static occupancy engine 206 can implement the inverse sensor model to predict the probability that a cell is occupied given the information from the boundary information determination engine 204.

Figure 7:
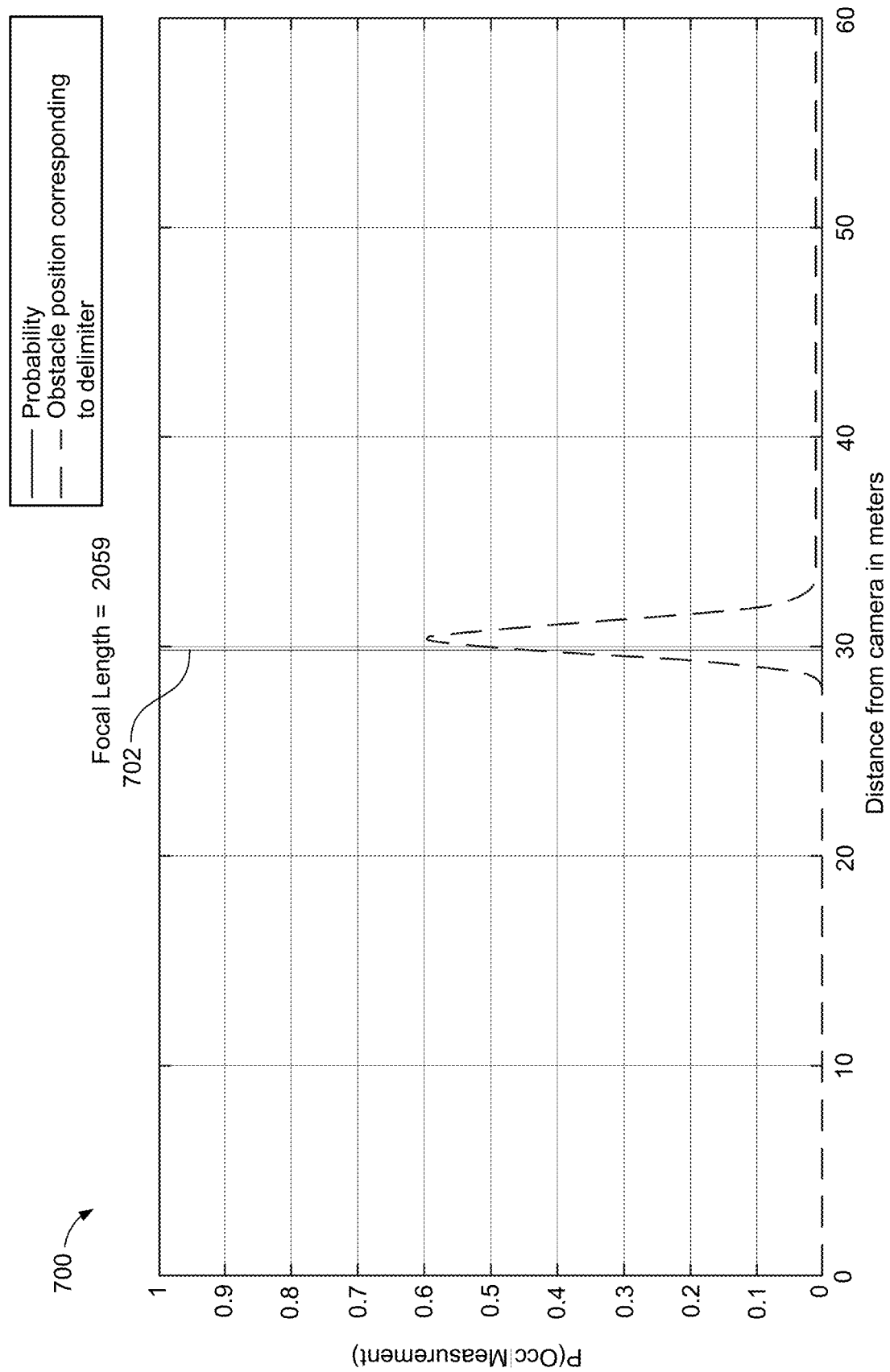
FIG. 7 is a graph illustrating a graphical representation of probabilities determined for an image using the inverse sensor model, in accordance with some examples.
Figure 8:
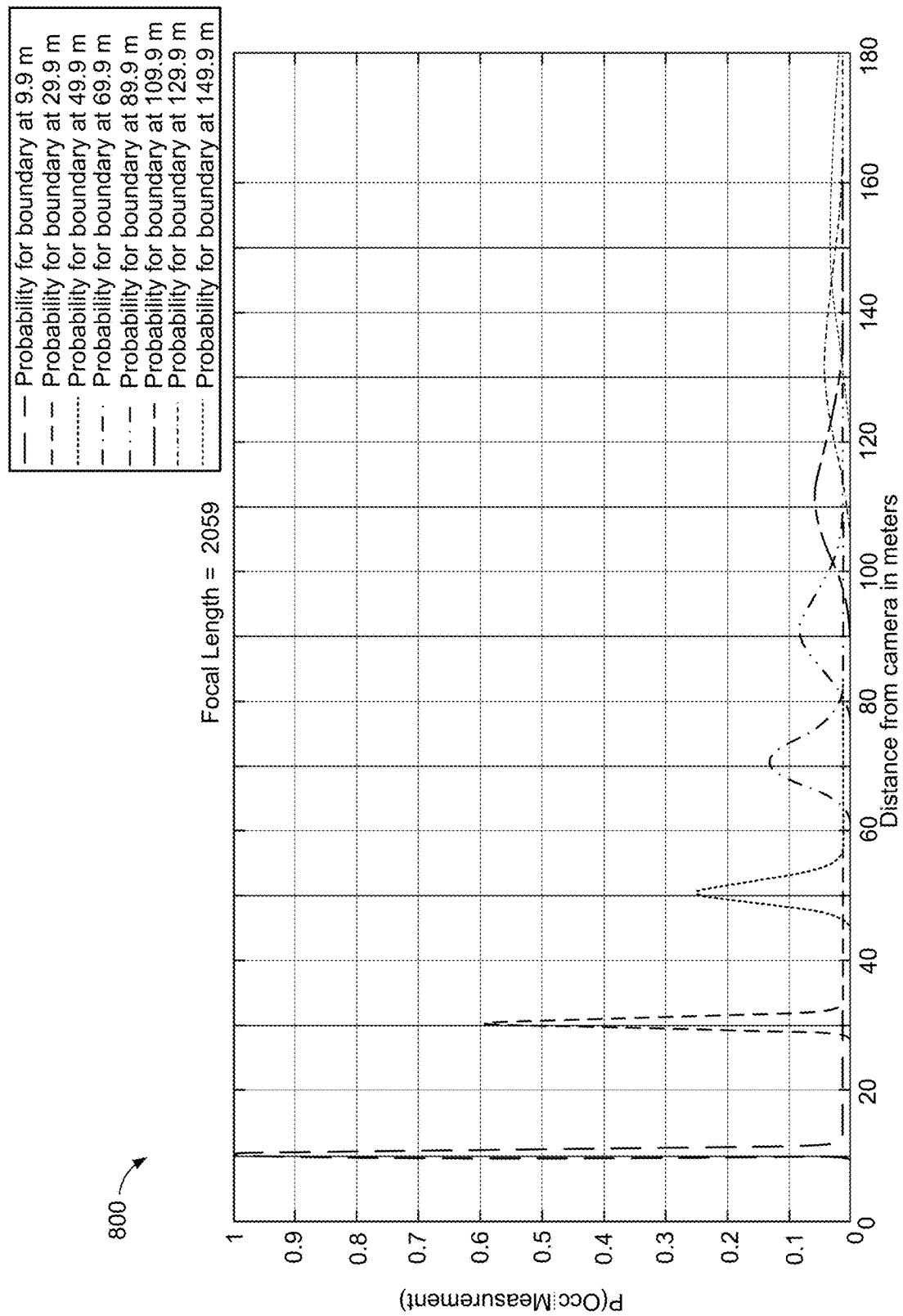
FIG. 8 is a graph illustrating a graphical representation of probabilities determined for an image using the inverse sensor model, in accordance with some examples.

As illustrated in FIG. 7 (showing a single boundary point or delimiter) and FIG. 8 (showing a multiple boundary points or delimiters), cells between the camera and the boundary denoted by the boundary points have a high probability of being free (not being occupied). This is due at least in part to the boundary points being identified as the lower-most pixel (relative to the bottom of the image) that is occupied by a static object. Based on such an observation, the space between the camera and that point is assumed to be unoccupied by any static object (e.g., the space is drivable). Cells close to a delimiter boundary with a static object have a high probability of being occupied. Cells close to a delimiter boundary with a dynamic object or with unknown pixels (e.g., sky, tunnel) have a probability close to the prior probability.

FIG. 7 is a graph 700 illustrating a graphical representation of the probabilities determined for an image using the inverse sensor model. The graph 700 plots the probabilities as a function of distance on the ground in a direction of an image column. A boundary point (or delimiter) determined for a particular column of the image is represented as line 702. As shown, the boundary point for the column corresponds to a drivable space (DS) boundary at 29.9 m. The prior for the cell is set to a value of 0.01 and Gaussian pixel noise can be applied. As shown, the probability is close to zero before the boundary point. The probability is close to the prior value beyond the boundary point. The spread in probability near the boundary point us due to pixel noise (a-=2 pixels).

FIG. 8 is a graph 800 illustrating a graphical representation of the probabilities determined for an image using the inverse sensor model for Gaussian pixel noise. The graph 800 plots the probabilities as a function of distance on the ground in a direction of a column for a particular camera. Each curve shown in the graph 800 illustrates probabilities for different distances to a static object (e.g., an obstacle) corresponding to an observed bound point (or delimiter) for that static object. As shown, at closer distances, the probability peaks are sharper (close to the peak), and the probability value decays rapidly as a function of the distance from the point with the maximum probability.

Figure 9:
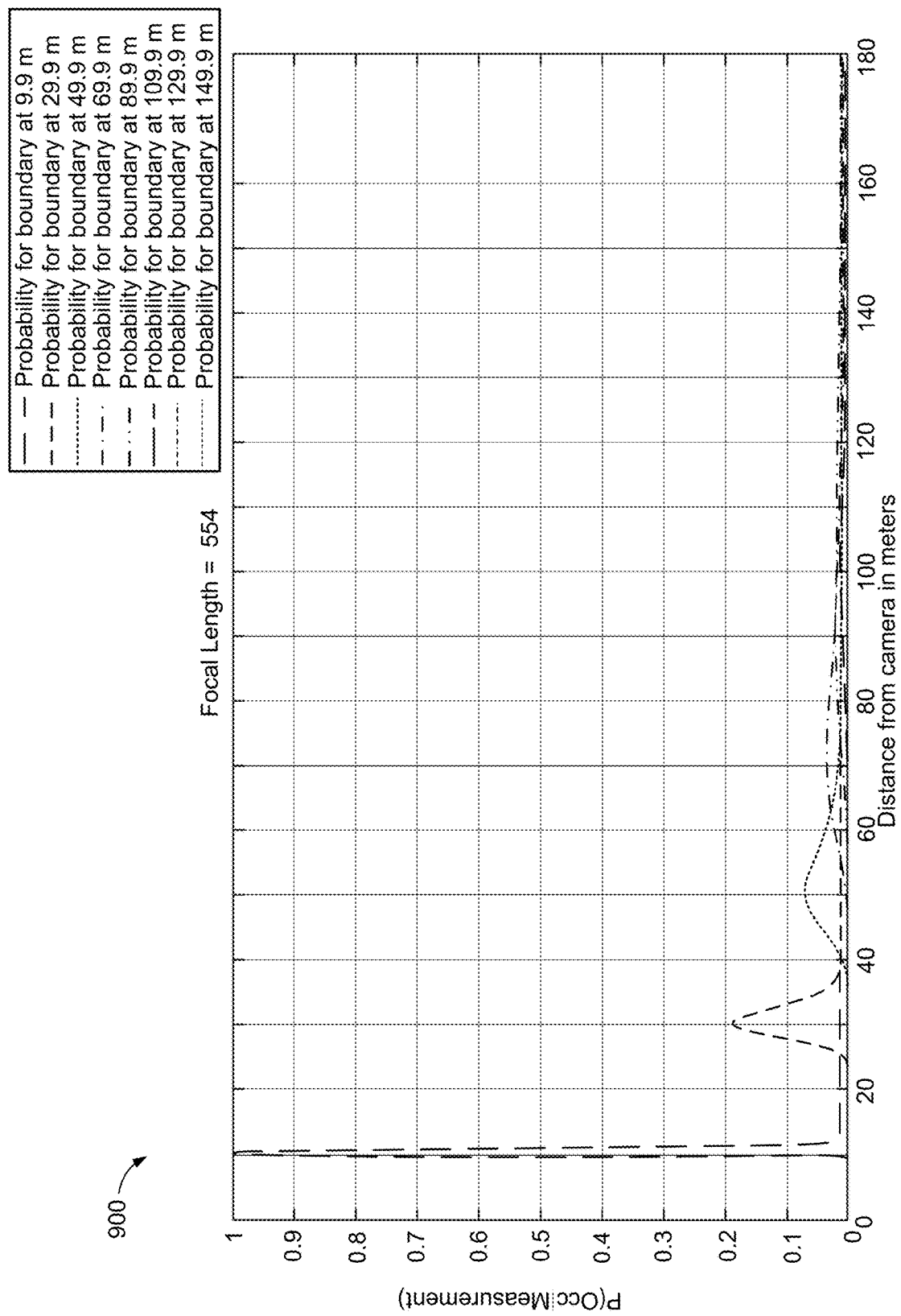
FIG. 9 is a graph illustrating a graphical representation of probabilities determined for an image using the inverse sensor model, in accordance with some examples.

FIG. 9 is a graph 900 illustrating a graphical representation of the probabilities determined for an image using the inverse sensor model for Gaussian pixel noise. The graph 900 plots the probabilities as a function of distance on the ground in a direction of column for a different camera with a lower focal length. As shown in FIG. 9, the sharpness of probabilities drops even at shorter distances.

The output engine 208 can obtain the probabilities (e.g., for the cells in the region of interest 406) from the static occupancy engine 206. Using the probabilities, the output engine 208 can perform one or more functions related to the locations associated with the cells in the static occupancy grid. For example, as noted above the output engine 208 can use the output from the static occupancy engine 206 to determine certain behaviors to perform and/or determine certain motion and/or other actions to achieve such behaviors. For instance, the output engine 208 can determine a behavior (e.g., lane change, in-lane maneuver, hard brake, etc.) for the tracking object 404 to take given the current state of the environment. In some examples, the output engine 208 can determine that one or more safety functions are to be performed in the event the probabilities indicate that a static object occupies a portion of the grid. In one illustrative example, the output engine 208 can be part of a vehicle and can perform one or more driving safety functions based on the probabilities, such as by evaluating the safety of planned routes and outputting an alert, re-routing the vehicle, slowing the vehicle down, any combination thereof and/or perform one or more other functions. In another example, if the probabilities from the static occupancy grid predict a high occupancy for a zone or region in front of the one or more cameras 202 of the system 200, a motion planning system may apply braking to slow down the vehicle, plan a lane change maneuver or an in-lane maneuver to avoid the obstacle, and/or perform other functions. In another example, the probabilities predicted using the static occupancy grid can be used by the output engine 208 together with other considerations, such as smoothness of motion, in defining a cost function for optimization. The output engine 208 can optimize the cost function to determine an optimal motion plan for a tracking object (e.g., a vehicle).

Figure 10:
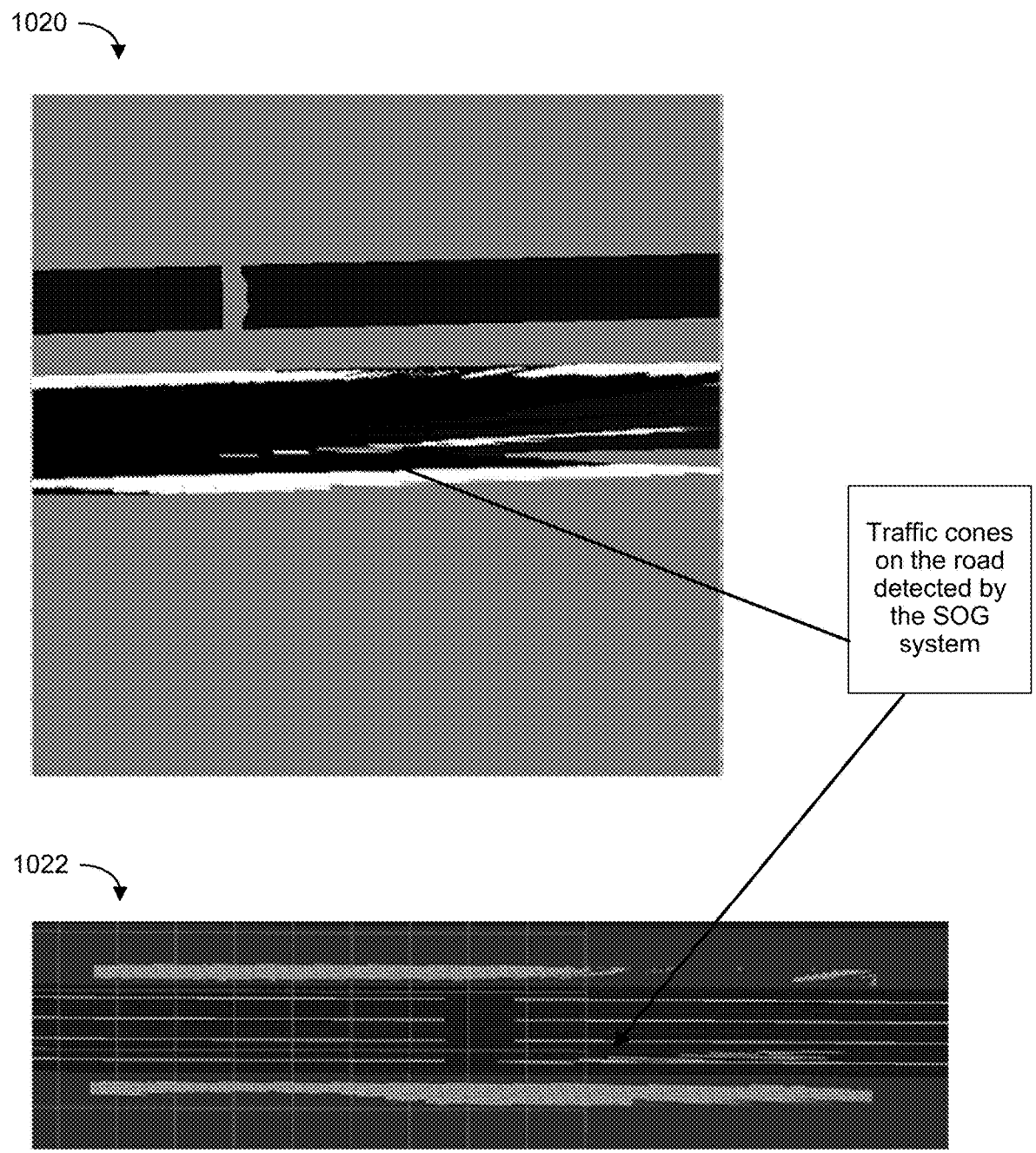
FIG. 10 is a diagram illustrating a top view of a sample output from a static occupancy grid, in accordance with some examples.
Figure 11A:
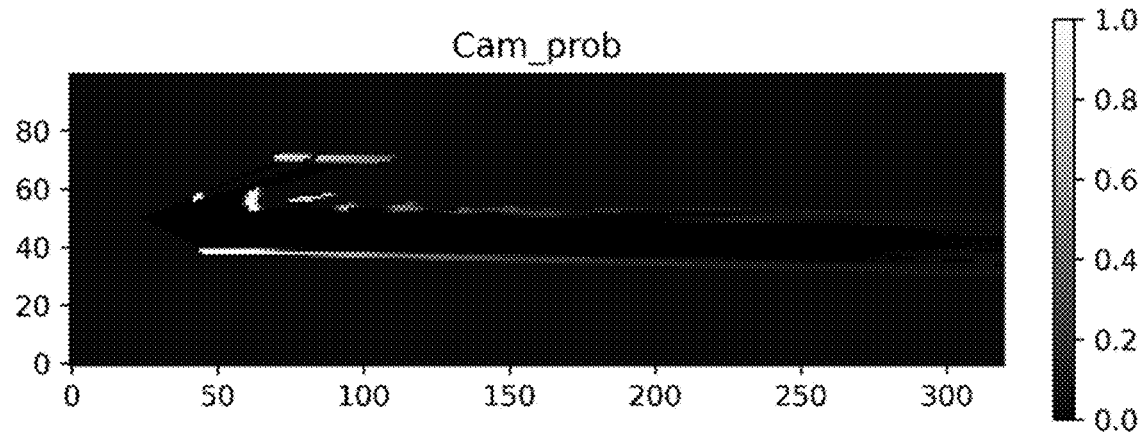
FIG. 11A and FIG. 11B are diagrams illustrating additional examples of top views of a sample output from the static occupancy grid, in accordance with some examples.
Figure 11B:
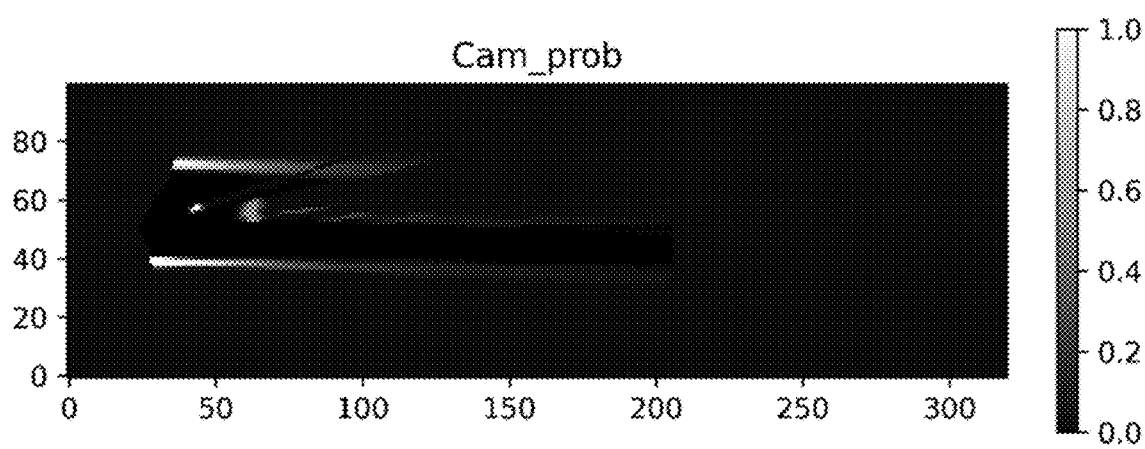
Figure 12:
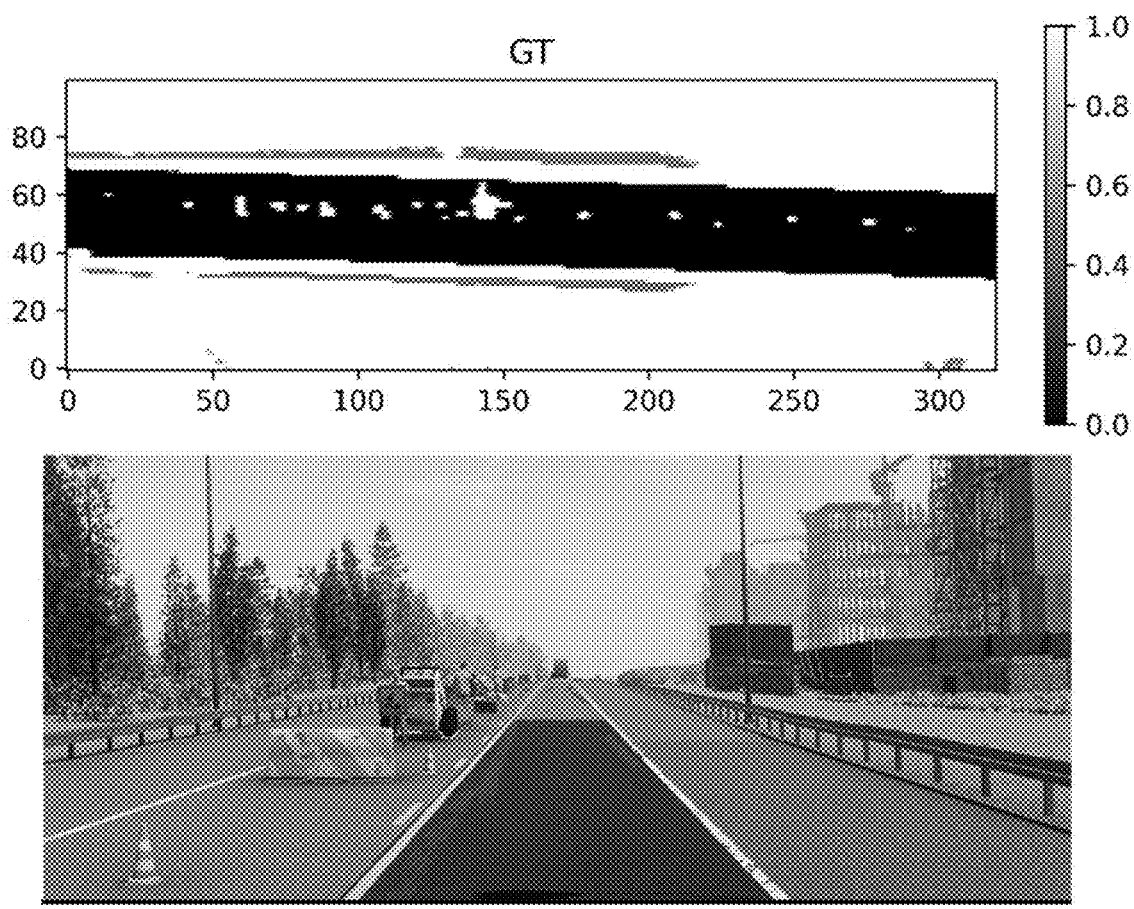
FIG. 12 is a diagram illustrating a first image (top image) representing a ground truth (GT) of the actual occupancies for a region over which a static occupancy grid based system is trying to estimate occupancy probabilities, and a second image (bottom image) representing a corresponding camera image with annotations illustrating example boundary information, in accordance with some examples.

FIG. 10 is a diagram illustrating a top view 1020 of the sample output from the static occupancy grid. In the top view 1020, brighter positions have higher probability than darker ones. FIG. 10 also illustrates a top view 1022 of the sample output from the static occupancy grid superimposed on the map of a road. In the top view 1022, the cells in bright orange are those with high probability of occupancy in the static occupancy grid output. FIG. 1A and FIG. 11B are images illustrating measurement probabilities output by the inverse sensor model using a single camera image (or frame). FIG. 11A is for a camera with 50 degree field of view and focal length 2059, while FIG. 11B is for a camera with 150 degrees field of view and focal length 554. FIG. 12 includes images indicating the ground truth occupancies.

Figure 13:
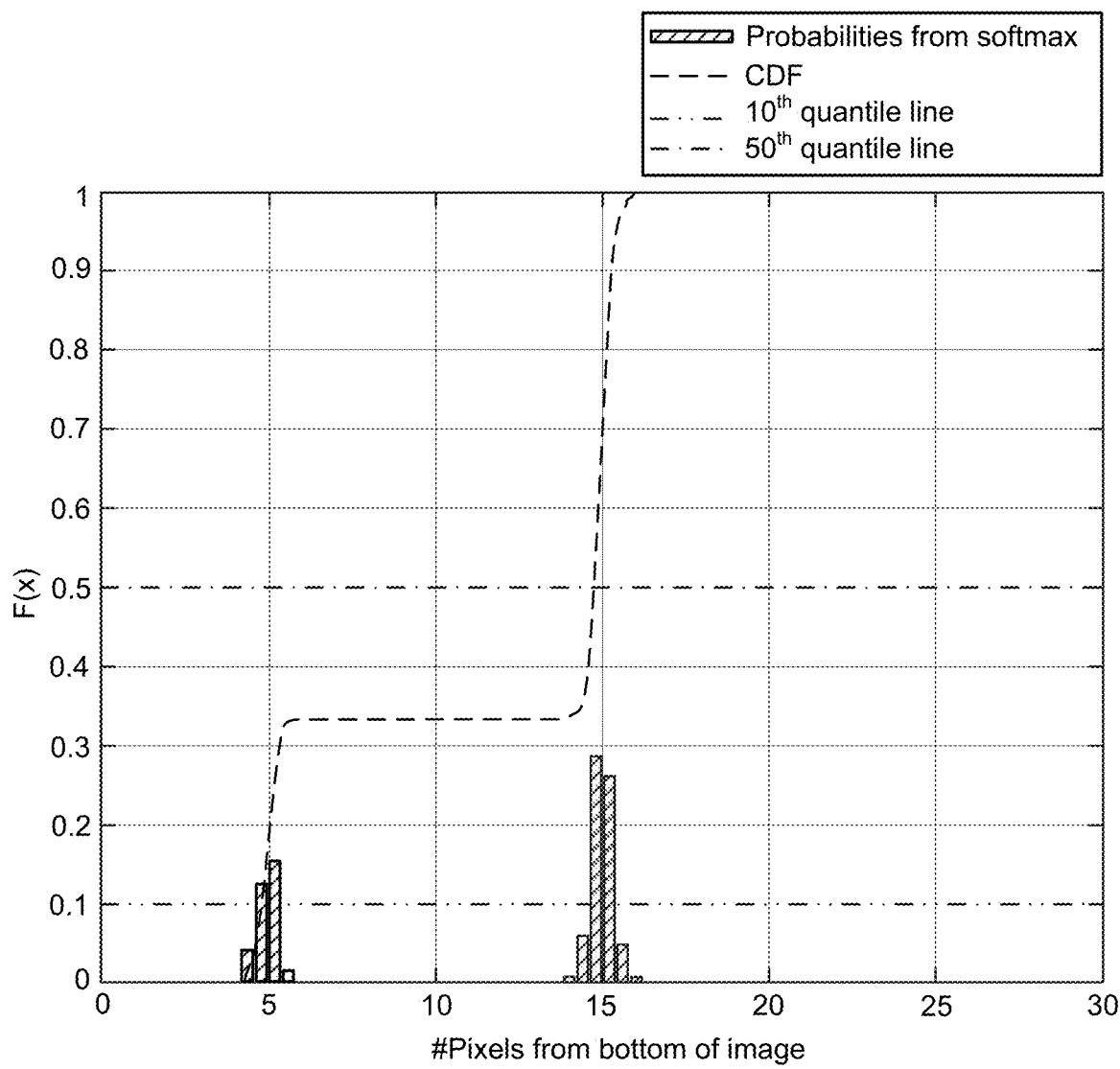
FIG. 13 is a graph illustrating a conservative update technique using quantiles, in accordance with some examples.

FIG. 13 is a graph illustrating a technique that can be used to perform conservative updates using quantiles. For instance, given quantiles, the system 200 can be more conservative in updating the probabilities. In one illustrative example, the system 200 can utilize $10^{th}$ and $50^{th}$ quantiles of the softmax distribution in each column. For instance, the system 200 can assign low values for the probability predicted by the inverse sensor model to grid cells whose projected pixel coordinates are below the $10^{th}$ quantile, and can assign moderately low probabilities for grid cells that project to pixels between the $10^{th}$ to $50^{th}$ quantile, and so on.

Figure 14:
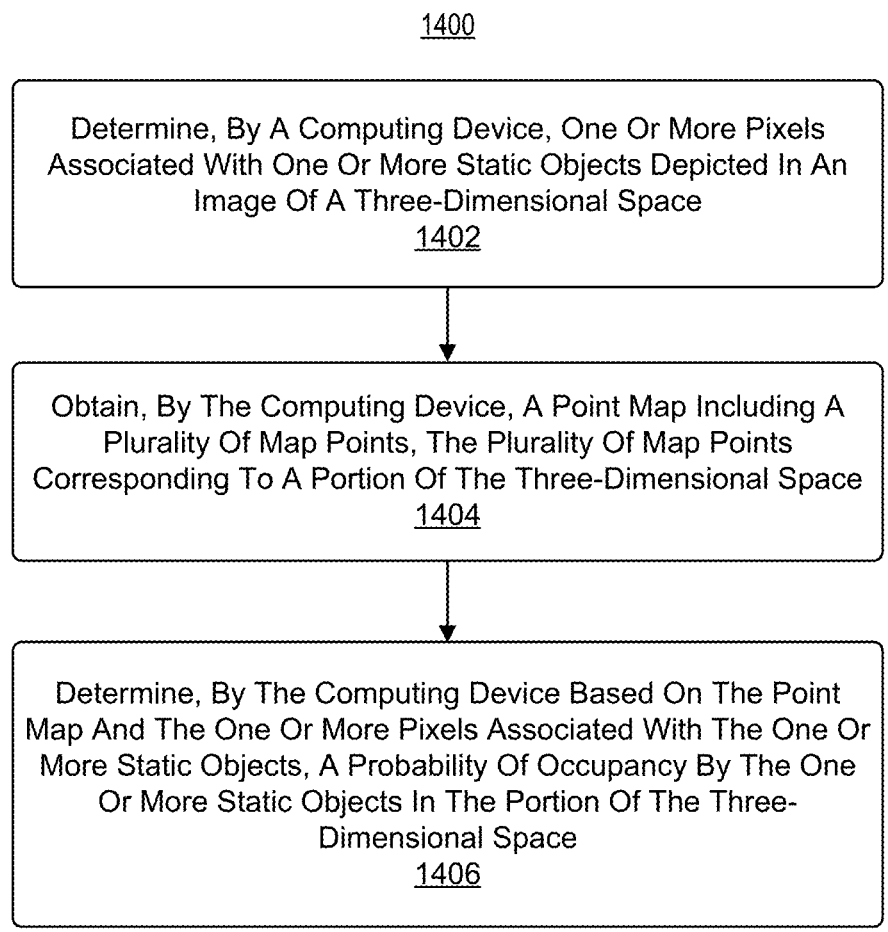
FIG. 14 is a flowchart illustrating an example of a process of determining static occupancy, in accordance with some examples.

FIG. 14 is a flowchart illustrating an example of a process 1400 of detecting one or more static objects using the techniques described herein. At block 1402, the process 1400 includes determining, by a computing device, one or more pixels associated with one or more static objects depicted in one or more images of a three-dimensional space. The one or more static objects are static with respect to the three-dimensional space. For instance, a static object is relatively still or stationary in the three-dimensional space or scene. In one illustrative example, a static object can include a traffic cone in a lane on a driving surface such as a road. In some aspects, the computing device is included as part of a vehicle, a robotics device or system, or other device or system. In some examples, the one or more pixels include boundary pixels. For instance, each pixel of the one or more pixels can include a lower-most pixel in a column of an image (of the one or more images) that is occupied by a static object of the one or more static objects in the three-dimensional space. In some cases, the column of the image includes a column of pixels of the image. In some examples, the one or more pixels includes all pixels in a particular image of one or more images.

In some cases, the boundary information determination engine 204 can determine the one or more pixels. For instance, as described above, the boundary information determination engine 204 can determine the one or more pixels associated with the one or more static objects based on one or more machine learning models. In some aspects, each machine learning model of the one or more machine learning models includes a deep learning neural network (e.g., a convolutional neural network (CNN)) configured to predict that the one or more pixels are occupied by at least one object in the three-dimensional space. For instance, the deep learning neural network can determine a pixel is a lower-most pixel (in a column of an image) that is occupied by a static object of the one or more static objects in the three-dimensional space. In another example, the deep learning neural network can determine or predict a drivable or non-drivable class label for every pixel in an image. In some examples, the deep learning neural network is further configured to predict whether each pixel of the one or more pixels is associated with a static object or a dynamic object. As noted above, the determination of whether each pixel is associated with a static or dynamic object can be used to determine a probability to apply to cells of a static occupancy grid that correspond to the pixels.

In some aspects, a machine learning model of the one or more machine learning models is associated with a camera used to capture an image of the one or more images. For instance, one or more cameras can be used to capture the one or more images of the three-dimensional space, and each camera of the one or more cameras can include a machine learning model that is used to determine boundary information (e.g., the one or more pixels). In one example, the computing device can include or be in communication with multiple cameras. Each camera of the one or more cameras can include a machine learning model.

At block 1404, the process 1400 includes obtaining, by the computing device, a point map including a plurality of map points, the plurality of map points corresponding to a portion of the three-dimensional space. In some cases, the portion of the three-dimensional space includes a driving surface (e.g., a road, path, or other driving surface) in the three-dimensional space. In such cases, the one or more static objects can be located on the driving surface. In some aspects, the point map includes a high definition (HD) map. In one illustrative example, the point map can include the point map 207 of FIG. 2. For instance, as described above using a driving surface as an example of the portion of the three-dimensional space, the point map can include information representing lanes on the driving surface as a connected set of points. Line segments can be defined between two map points, where multiple line segments define the different lines of the lanes (e.g., boundary lines and center lines of a lane). In some cases, the point map can include semantic information for objects in the three-dimensional space.

At block 1406, the process 1400 includes determining, by the computing device based on the point map and the one or more pixels associated with the one or more static objects, a probability of occupancy by the one or more static objects in the portion of the three-dimensional space. In some aspects, to determine the probability of occupancy by the one or more static objects in the portion of the three-dimensional space, the process 1400 can include determining a probability of occupancy for each cell in a grid (e.g., a static occupancy grid, such as the grid 400 of FIG. 4) associated with the portion of the three-dimensional space. In some examples, the process 1400 can include updating the probability of occupancy for each cell using a Bayesian filter, as described above. In some cases, to determine the probability of occupancy for each cell in the grid, the process 1400 can include determining probabilities of occupancy for all cells of the grid within a rectangular region around an object including the computing device (e.g., in the region 408 around the tracking object 404 of FIG. 4). In some aspects, the object including the computing device is a vehicle, a robotics device or system, or other tracking object.

In some aspects, the process 1400 includes determining, based on a pixel of the one or more pixels in a column of an image of the one or more images, a line of intersection (e.g., the ray 510 shown in FIG. 5B) of a plane of the grid and a plane corresponding to the column. The process 1400 can include determining one or more probabilities of occupancy for one or more points along the line of intersection. In some examples, the process 1400 can determine probabilities of occupancy for multiple points along multiple lines of intersection (e.g., as shown in FIG. 6).

In some examples, the process 1400 includes determining a probability of occupancy for a cell in the grid at least in part by determining a representative probability of occupancy from at least the one or more probabilities of occupancy for the one or more points along the line of intersection or for points along all intersecting lines in a given cell (e.g., for certain points along all lines in the cell 614 of FIG. 6). In some cases, the representative probability of occupancy includes a maximum probability, a mean probability, or other representative probability of the one or more points along the line or lines of intersection through the cell.

In some aspects, as described previously, the one or more probabilities of occupancy are determined based on information from the point map. For instance, the information from the point map includes a height, a normal, or other information associated with a point on the plane of the grid.

In some aspects, the one or more pixels associated with the one or more static objects are generated at least in part by processing the one or more images using a computer vision algorithm. In some cases, the computer vision algorithm is configured to perform temporal tracking to estimate the one or more pixels.

In some examples, the process 1400 can combine information (e.g., probabilities, boundary information, etc.) across multiple images that are captured of the three-dimensional space. The process 1400 (e.g., using the static occupancy engine 206) can obtain a final inverse sensor model that predicts probabilities of occupancy for all cells in the grid that are associated with the portion of the three-dimensional space. The final inverse sensor model can predict the probabilities of occupancy for all cells in the grid (associated with the portion of the three-dimensional space) given the outputs from the boundary information determination engine 204 for individual images.

In some examples, the processes described herein (e.g., process 1400 and/or other process described herein) may be performed by a computing device or apparatus, such as a computing device implementing the system 200 of FIG. 2. In some examples, the computing device can include the architecture of the computing system 1700 of FIG. 17. In one example, the process 1400 can be performed by the computing system 1700 implementing the system 200. The computing device can include any suitable device, such as an autonomous vehicle, a robotic device or system, a mobile device (e.g., a mobile phone), a desktop computing device, a tablet computing device, a wearable device, and/or any other computing device with the resource capabilities to perform the processes described herein, including process 1400. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, the boundary information determination engine 204 can include one or more machine learning models, such as one or more deep learning neural networks. Illustrative examples of neural network architectures that can be used by the boundary information determination engine 204 include convolutional neural networks (CNNs), autoencoders, deep belief nets (DBNs), Recurrent Neural Networks (RNNs), Generative Adversarial Networks (GANs), any combination thereof, or any other suitable neural network.

Figure 15:
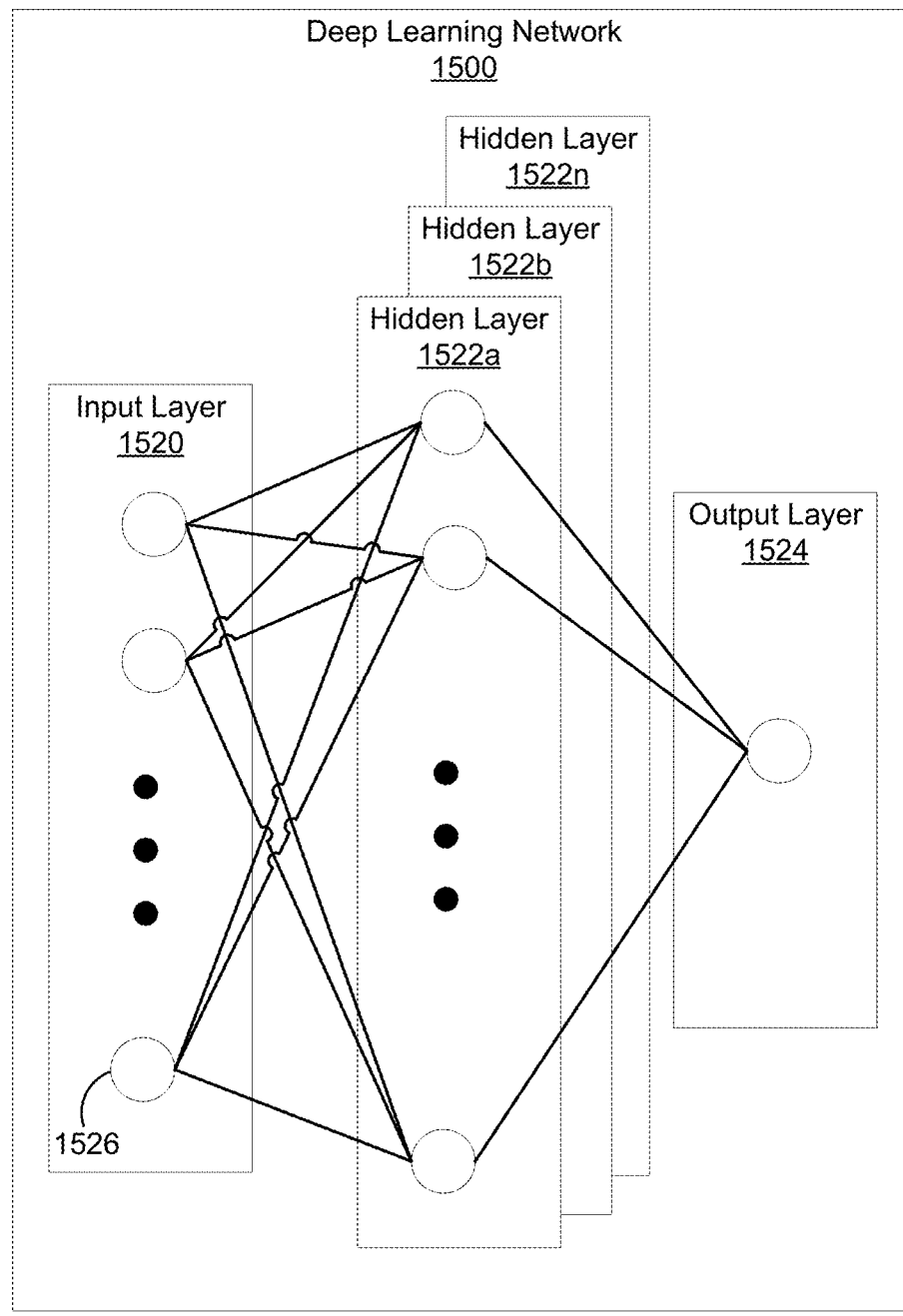
FIG. 15 is a block diagram illustrating an example of a deep learning network, in accordance with some examples.

FIG. 15 is an illustrative example of a deep learning neural network 1500 that can be used by the boundary information determination engine 204. An input layer 1520 includes input data. In one illustrative example, the input layer 1520 can include data representing the pixels of an input image or video frame. The neural network 1500 includes multiple hidden layers 1522a, 1522b, through 1522n. The hidden layers 1522a, 1522b, through 1522n include "n" number of hidden layers, where "n" is an integer greater than or equal to one. The number of hidden layers can be made to include as many layers as needed for the given application. The neural network 1500 further includes an output layer 1524 that provides an output resulting from the processing performed by the hidden layers 1522a, 1522b, through 1522n. In one illustrative example, the output layer 1524 can provide a classification for an object in an input image or video frame. The classification can include a class identifying the type of object (e.g., a static object, a vehicle, a person, a dog, a cat, or other object).

The neural network 1500 is a multi-layer neural network of interconnected nodes. Each node can represent a piece of information. Information associated with the nodes is shared among the different layers and each layer retains information as information is processed. In some cases, the neural network 1500 can include a feed-forward network, in which case there are no feedback connections where outputs of the network are fed back into itself. In some cases, the neural network 1500 can include a recurrent neural network, which can have loops that allow information to be carried across nodes while reading in input.

Information can be exchanged between nodes through node-to-node interconnections between the various layers. Nodes of the input layer 1520 can activate a set of nodes in the first hidden layer 1522a. For example, as shown, each of the input nodes of the input layer 1520 is connected to each of the nodes of the first hidden layer 1522a. The nodes of the hidden layers 1522a, 1522b, through 1522n can transform the information of each input node by applying activation functions to these information. The information derived from the transformation can then be passed to and can activate the nodes of the next hidden layer 1522b, which can perform their own designated functions. Example functions include convolutional, up-sampling, data transformation, and/or any other suitable functions. The output of the hidden layer 1522b can then activate nodes of the next hidden layer, and so on. The output of the last hidden layer 1522n can activate one or more nodes of the output layer 1524, at which an output is provided. In some cases, while nodes (e.g., node 1526) in the neural network 1500 are shown as having multiple output lines, a node has a single output and all lines shown as being output from a node represent the same output value.

In some cases, each node or interconnection between nodes can have a weight that is a set of parameters derived from the training of the neural network 1500. Once the neural network 1500 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1500 to be adaptive to inputs and able to learn as more and more data is processed.

The neural network 1500 is pre-trained to process the features from the data in the input layer 1520 using the different hidden layers 1522a, 1522b, through 1522n in order to provide the output through the output layer 1524. In an example in which the neural network 1500 is used to identify objects in images, the neural network 1500 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1500 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1500 is trained well enough so that the weights of the layers are accurately tuned.

For the example of identifying objects in images, the forward pass can include passing a training image through the neural network 1500. The weights are initially randomized before the neural network 1500 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1500, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1500 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}$ (target−output)$^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1500 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1500 can include any suitable deep network. One example includes a convolutional neural network (CNN), which includes an input layer and an output layer, with multiple hidden layers between the input and out layers. An example of a CNN is described below with respect to FIG. 14. The hidden layers of a CNN include a series of convolutional, nonlinear, pooling (for downsampling), and fully connected layers. The neural network 1500 can include any other deep network other than a CNN, such as an autoencoder, a deep belief nets (DBNs), a Recurrent Neural Networks (RNNs), among others.

Figure 16:
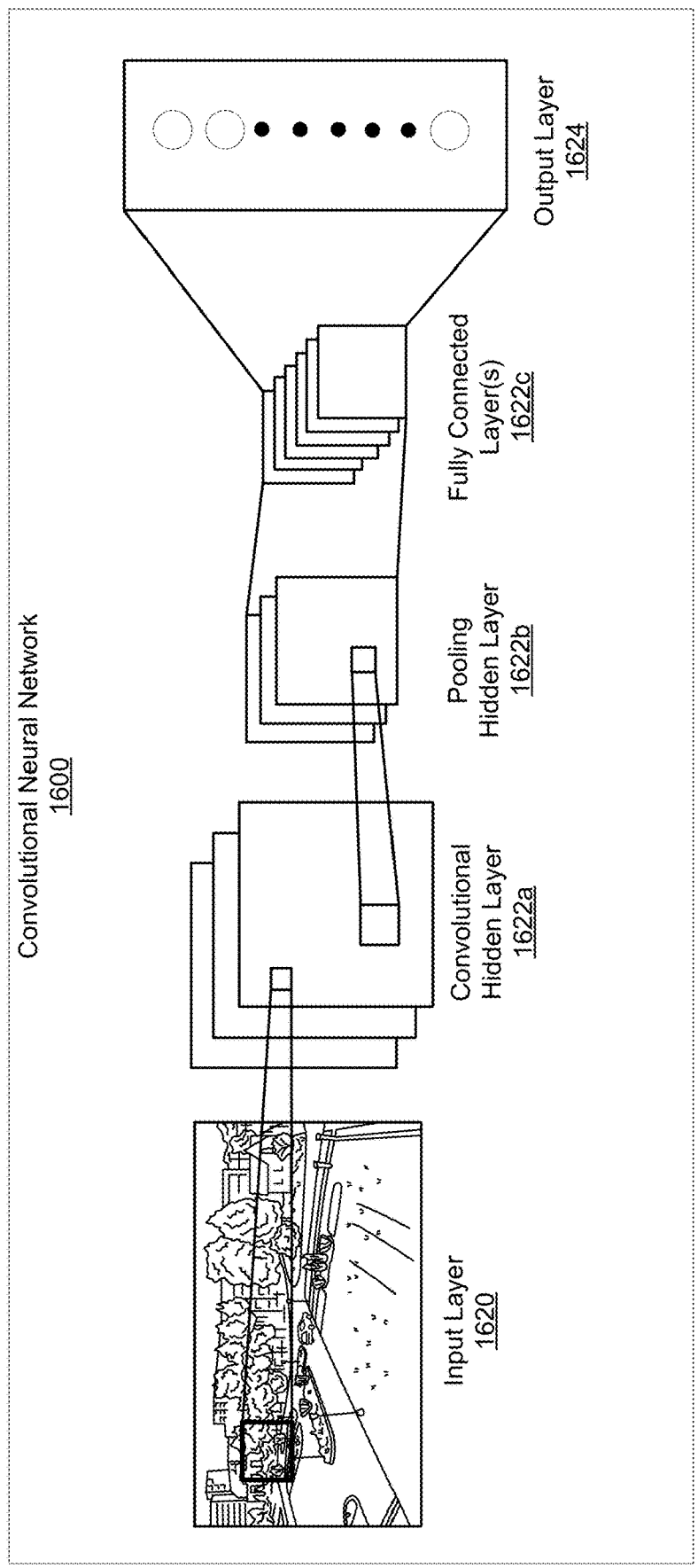
FIG. 16 is a block diagram illustrating an example of a convolutional neural network, in accordance with some examples.

FIG. 16 is an illustrative example of a convolutional neural network 1600 (CNN 1600). The input layer 1620 of the CNN 1600 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1622a, an optional non-linear activation layer, a pooling hidden layer 1622b, and fully connected hidden layers 1622c to get an output at the output layer 1624. While only one of each hidden layer is shown in FIG. 16, one of ordinary skill will appreciate that multiple convolutional hidden layers, non-linear layers, pooling hidden layers, and/or fully connected layers can be included in the CNN 1600. As previously described, the output can indicate a single class of an object or can include a probability of classes that best describe the object in the image.

The first layer of the CNN 1600 is the convolutional hidden layer 1622a. The convolutional hidden layer 1622a analyzes the image data of the input layer 1620. Each node of the convolutional hidden layer 1622a is connected to a region of nodes (pixels) of the input image called a receptive field. The convolutional hidden layer 1622a can be considered as one or more filters (each filter corresponding to a different activation or feature map), with each convolutional iteration of a filter being a node or neuron of the convolutional hidden layer 1622a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1622a. Each connection between a node and a receptive field for that node learns a weight and, in some cases, an overall bias such that each node learns to analyze its particular local receptive field in the input image. Each node of the hidden layer 1622a will have the same weights and bias (called a shared weight and a shared bias). For example, the filter has an array of weights (numbers) and the same depth as the input. A filter will have a depth of 3 for the image or video frame example (according to three color components of the input image). An illustrative example size of the filter array is 5×5×3, corresponding to a size of the receptive field of a node.

The convolutional nature of the convolutional hidden layer 1622a is due to each node of the convolutional layer being applied to its corresponding receptive field. For example, a filter of the convolutional hidden layer 1622a can begin in the top-left corner of the input image array and can convolve around the input image. As noted above, each convolutional iteration of the filter can be considered a node or neuron of the convolutional hidden layer 1622a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1622a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1622a.

The mapping from the input layer to the convolutional hidden layer 1622a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1622a can include several activation maps in order to identify multiple features in an image. The example shown in FIG. 16 includes three activation maps. Using three activation maps, the convolutional hidden layer 1622a can detect three different kinds of features, with each feature being detectable across the entire image.

In some examples, a non-linear hidden layer can be applied after the convolutional hidden layer 1622a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1600 without affecting the receptive fields of the convolutional hidden layer 1622a.

The pooling hidden layer 1622b can be applied after the convolutional hidden layer 1622a (and after the non-linear hidden layer when used). The pooling hidden layer 1622b is used to simplify the information in the output from the convolutional hidden layer 1622a. For example, the pooling hidden layer 1622b can take each activation map output from the convolutional hidden layer 1622a and generates a condensed activation map (or feature map) using a pooling function. Max-pooling is one example of a function performed by a pooling hidden layer. Other forms of pooling functions be used by the pooling hidden layer 1622a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1622a. In the example shown in FIG. 16, three pooling filters are used for the three activation maps in the convolutional hidden layer 1622a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1622a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1622a having a dimension of 24×24 nodes, the output from the pooling hidden layer 1622b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1600.

The final layer of connections in the network is a fully-connected layer that connects every node from the pooling hidden layer 1622b to every one of the output nodes in the output layer 1624. Using the example above, the input layer includes 28×28 nodes encoding the pixel intensities of the input image, the convolutional hidden layer 1622a includes 3×24×24 hidden feature nodes based on application of a 5×5 local receptive field (for the filters) to three activation maps, and the pooling layer 1622b includes a layer of 3×12×12 hidden feature nodes based on application of max-pooling filter to 2×2 regions across each of the three feature maps. Extending this example, the output layer 1624 can include ten output nodes. In such an example, every node of the 3×12×12 pooling hidden layer 1622b is connected to every node of the output layer 1624.

The fully connected layer 1622c can obtain the output of the previous pooling layer 1622b (which should represent the activation maps of high-level features) and determines the features that most correlate to a particular class. For example, the fully connected layer 1622c layer can determine the high-level features that most strongly correlate to a particular class, and can include weights (nodes) for the high-level features. A product can be computed between the weights of the fully connected layer 1622c and the pooling hidden layer 1622b to obtain probabilities for the different classes. For example, if the CNN 1600 is being used to predict that an object in an image or video frame is a vehicle, high values will be present in the activation maps that represent high-level features of vehicles (e.g., two or four tires, a windshield, side view mirrors, etc.).

In some examples, the output from the output layer 1624 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a person), an 80% probability that the image is the fourth class of object (e.g., a static object on a road or other driving surface), and a 15% probability that the image is the sixth class of object (e.g., a vehicle). The probability for a class can be considered a confidence level that the object is part of that class.

Figure 17:
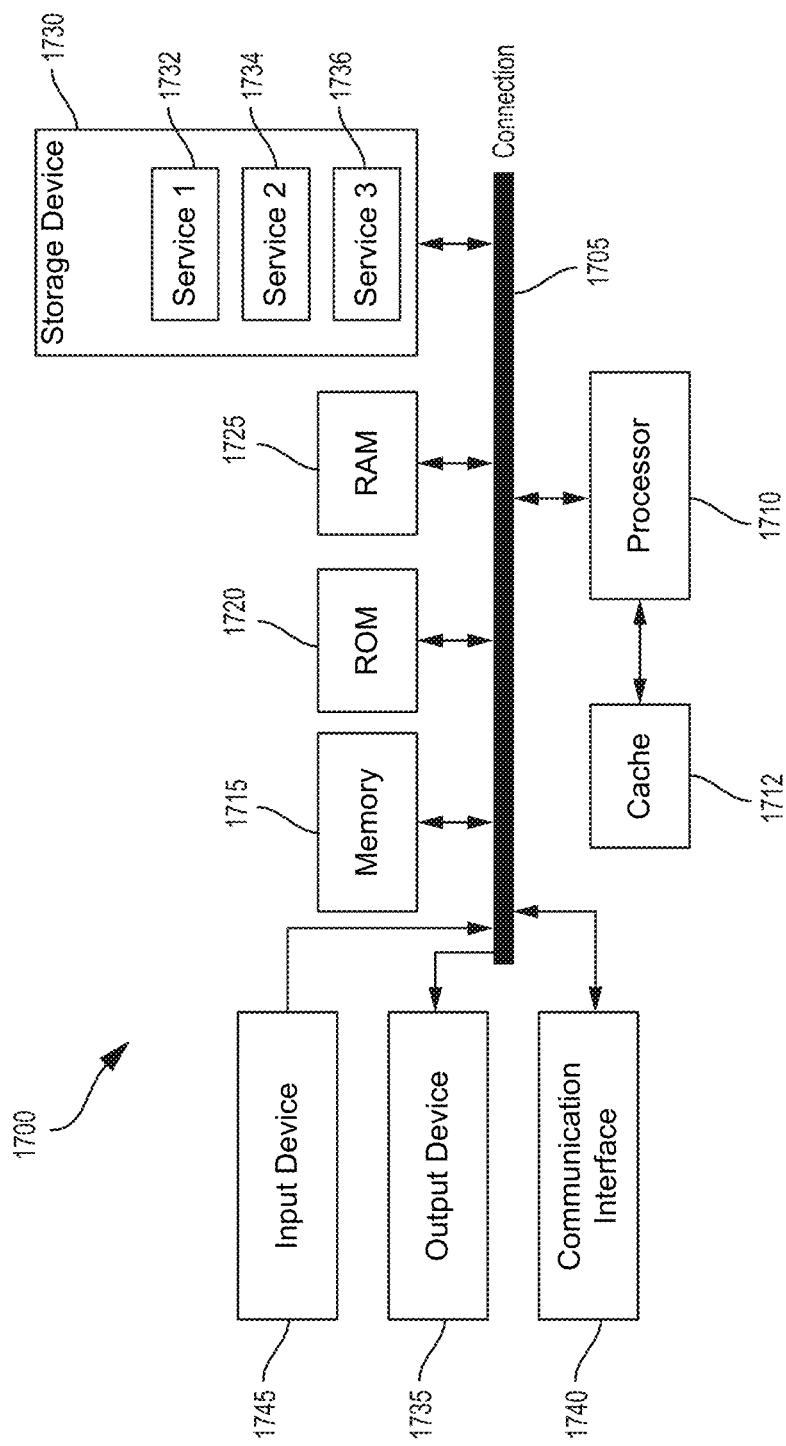
FIG. 17 is a block diagram of an exemplary computing device that may be used to implement some aspects of the technology described herein, in accordance with some examples.

FIG. 17 illustrates an example computing system 1700 of an example computing device which can implement the various techniques described herein. For example, the computing system 1700 can implement the system 200 shown in FIG. 2. The components of computing system 1700 are shown in electrical communication with each other using connection 1705, such as a bus. The example computing system 1700 includes a processing unit (CPU or processor) 1710 and computing device connection 1705 that couples various computing device components including computing device memory 1715, such as read only memory (ROM) 1720 and random access memory (RAM) 1725, to processor 1710.

Computing system 1700 can include a cache of high-speed memory connected directly with, in close proximity to, or integrated as part of processor 1710. Computing system 1700 can copy data from memory 1715 and/or the storage device 1730 to cache 1712 for quick access by processor 1710. In this way, the cache can provide a performance boost that avoids processor 1710 delays while waiting for data. These and other modules can control or be configured to control processor 1710 to perform various actions. Other computing device memory 1715 may be available for use as well. Memory 1715 can include multiple different types of memory with different performance characteristics. Processor 1710 can include any general purpose processor and a hardware or software service, such as service 1 1732, service 2 1734, and service 3 1736 stored in storage device 1730, configured to control processor 1710 as well as a special-purpose processor where software instructions are incorporated into the processor design. Processor 1710 may be a self-contained system, containing multiple cores or processors, a bus, memory controller, cache, etc. A multi-core processor may be symmetric or asymmetric.

To enable user interaction with the computing system 1700, input device 1745 can represent any number of input mechanisms, such as a microphone for speech, a touch-sensitive screen for gesture or graphical input, keyboard, mouse, motion input, speech and so forth. Output device 1735 can also be one or more of a number of output mechanisms known to those of skill in the art, such as a display, projector, television, speaker device, etc. In some instances, multimodal computing devices can enable a user to provide multiple types of input to communicate with computing system 1700. Communication interface 1740 can generally govern and manage the user input and computing device output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1725, read only memory (ROM) 1720, and hybrids thereof. Storage device 1730 can include services 1732, 1734, 1736 for controlling processor 1710. Other hardware or software modules are contemplated. Storage device 1730 can be connected to the computing device connection 1705. In one aspect, a hardware module that performs a particular function can include the software component stored in a computer-readable medium in connection with the necessary hardware components, such as processor 1710, connection 1705, output device 1735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

ILLUSTRATIVE ASPECTS OF THE DISCLOSURE INCLUDE

Aspect 1: A method of detecting one or more static objects. The method comprises: determining, by a computing device, one or more pixels associated with one or more static objects depicted in one or more images of a three-dimensional space, wherein the one or more static objects are static with respect to the three-dimensional space; obtaining, by the computing device, a point map including a plurality of map points, the plurality of map points corresponding to a portion of the three-dimensional space; and determining, by the computing device based on the point map and the one or more pixels associated with the one or more static objects, a probability of occupancy by the one or more static objects in the portion of the three-dimensional space.

Aspect 2: The method of aspect 1, wherein each pixel of the one or more pixels is a lower-most pixel in a column of an image that is occupied by a static object of the one or more static objects in the three-dimensional space.

Aspect 3: The method of aspect 2, wherein the column of the image includes a column of pixels of the image.

Aspect 4: The method of any one of aspects 1 to 3, wherein the one or more pixels associated with the one or more static objects are determined based on one or more machine learning models.

Aspect 5: The method of aspect 4, wherein each machine learning model of the one or more machine learning models includes a deep learning neural network configured to predict that the one or more pixels are occupied by at least one object in the three-dimensional space.

Aspect 6: The method of aspect 5, wherein the deep learning neural network is further configured to predict whether each pixel of the one or more pixels is associated with a static object or a dynamic object.

Aspect 7: The method of any one of aspects 4 to 6, wherein a machine learning model of the one or more machine learning models is associated with a camera used to capture an image of the one or more images.

Aspect 8: The method of any one of aspects 1 to 7, wherein determining the probability of occupancy by the one or more static objects in the portion of the three-dimensional space includes determining a probability of occupancy for each cell in a grid associated with the portion of the three-dimensional space.

Aspect 9: The method of aspect 8, further comprising updating the probability of occupancy for each cell using a Bayesian filter.

Aspect 10: The method of any one of aspects 8 or 9, wherein determining the probability of occupancy for each cell in the grid includes determining probabilities of occupancy for all cells of the grid within a rectangular region around an object including the computing device.

Aspect 11: The method of aspect 10, wherein the object including the computing device is a vehicle.

Aspect 12: The method of any one of aspects 8 to 11, further comprising: determining, based on a pixel of the one or more pixels in a column of an image of the one or more images, a line of intersection of a plane of the grid and a plane corresponding to the column; and determining one or more probabilities of occupancy for one or more points along the line of intersection.

Aspect 13: The method of aspect 12, further comprising determining a probability of occupancy for a cell in the grid at least in part by determining a representative probability of occupancy from at least the one or more probabilities of occupancy for the one or more points along the line of intersection.

Aspect 14: The method of aspect 13, wherein the representative probability of occupancy includes one of a maximum probability or a mean probability.

Aspect 15: The method of any one of aspects 12 to 14, wherein the one or more probabilities of occupancy are determined based on information from the point map.

Aspect 16: The method of aspect 15, wherein the information from the point map includes at least a height associated with a point on the plane of the grid.

Aspect 17: The method of any one of aspects 1 to 16, wherein the point map includes a high definition (HD) map.

Aspect 18: The method of any one of aspects 1 to 17, wherein the portion of the three-dimensional space includes a driving surface in the three-dimensional space.

Aspect 19: The method of aspect 18, wherein the one or more static objects are located on the driving surface.

Aspect 20: The method of any one of aspects 1 to 19, wherein the computing device is included as part of a vehicle.

Aspect 21: The method of any one of aspects 1 to 3 or aspects 8 to 20, wherein the one or more pixels associated with the one or more static objects are generated at least in part by processing the one or more images using a computer vision algorithm.

Aspect 22: The method of aspect 21, wherein the computer vision algorithm is configured to perform temporal tracking to estimate the one or more pixels.

Aspect 23: An apparatus for detecting one or more static objects. The apparatus comprises a memory configured to store at least one image and one or more processors coupled to the memory. The one or more processors are configured to: determine one or more pixels associated with one or more static objects depicted in one or more images of a three-dimensional space, wherein the one or more static objects are static with respect to the three-dimensional space; obtain a point map including a plurality of map points, the plurality of map points corresponding to a portion of the three-dimensional space; and determine, based on the point map and the one or more pixels associated with the one or more static objects, a probability of occupancy by the one or more static objects in the portion of the three-dimensional space.

Aspect 24: The apparatus of aspect 23, wherein each pixel of the one or more pixels is a lower-most pixel in a column of an image that is occupied by a static object of the one or more static objects in the three-dimensional space.

Aspect 25: The apparatus of aspect 24, wherein the column of the image includes a column of pixels of the image.

Aspect 26: The apparatus of any one of aspects 23 to 25, wherein the one or more pixels associated with the one or more static objects are determined based on one or more machine learning models.

Aspect 27: The apparatus of aspect 26, wherein each machine learning model of the one or more machine learning models includes a deep learning neural network configured to predict that the one or more pixels are occupied by at least one object in the three-dimensional space.

Aspect 28: The apparatus of aspect 27, wherein the deep learning neural network is further configured to predict whether each pixel of the one or more pixels is associated with a static object or a dynamic object.

Aspect 29: The apparatus of any one of aspects 26 to 28, wherein a machine learning model of the one or more machine learning models is associated with a camera used to capture an image of the one or more images.

Aspect 30: The apparatus of any one of aspects 23 to 29, wherein, to determine the probability of occupancy by the one or more static objects in the portion of the three-dimensional space, the one or more processors are configured to determine a probability of occupancy for each cell in a grid associated with the portion of the three-dimensional space.

Aspect 31: The apparatus of aspect 30, wherein the one or more processors are configured to update the probability of occupancy for each cell using a Bayesian filter.

Aspect 32: The apparatus of any one of aspects 30 or 31, wherein, to determine the probability of occupancy for each cell in the grid, the one or more processors are configured to determine probabilities of occupancy for all cells of the grid within a rectangular region around an object including the computing device.

Aspect 33: The apparatus of aspect 32, wherein the object including the computing device is a vehicle.

Aspect 34: The apparatus of any one of aspects 30 to 33, wherein the one or more processors are configured to: determine, based on a pixel of the one or more pixels in a column of an image of the one or more images, a line of intersection of a plane of the grid and a plane corresponding to the column; and determine one or more probabilities of occupancy for one or more points along the line of intersection.

Aspect 35: The apparatus of aspect 34, wherein the one or more processors are configured to determine a probability of occupancy for a cell in the grid at least in part by determining a representative probability of occupancy from at least the one or more probabilities of occupancy for the one or more points along the line of intersection.

Aspect 36: The apparatus of aspect 35, wherein the representative probability of occupancy includes one of a maximum probability or a mean probability.

Aspect 37: The apparatus of any one of aspects 34 to 36, wherein the one or more probabilities of occupancy are determined based on information from the point map.

Aspect 38: The apparatus of aspect 37, wherein the information from the point map includes at least a height associated with a point on the plane of the grid.

Aspect 39: The apparatus of any one of aspects 23 to 38, wherein the point map includes a high definition (HD) map.

Aspect 40: The apparatus of any one of aspects 23 to 39, wherein the portion of the three-dimensional space includes a driving surface in the three-dimensional space.

Aspect 41: The apparatus of aspect 40, wherein the one or more static objects are located on the driving surface.

Aspect 42: The apparatus of any one of aspects 23 to 25 or aspects 30 to 41, wherein the one or more pixels associated with the one or more static objects are generated at least in part by processing the one or more images using a computer vision algorithm.

Aspect 43: The apparatus of aspect 42, wherein the computer vision algorithm is configured to perform temporal tracking to estimate the one or more pixels.

Aspect 44: The apparatus of any one of aspects 23 to 43, wherein apparatus is a part of a vehicle.

Aspect 45: The apparatus of any one of aspects 23 to 44, wherein the apparatus is a vehicle.

Aspect 46: The apparatus of any one of aspects 23 to 44, wherein the apparatus is a robot.

Aspect 47: The apparatus of any one of aspects 23 to 46, further comprising at least one camera configured to capture the one or more images.

Aspect 48: The apparatus of any one of aspects 23 to 46, further comprising a plurality of cameras, at least one camera of the plurality of cameras being configured to capture the one or more images.

Aspect 49: A computer-readable storage medium storing instructions that, when executed, cause one or more processors to perform operations according to any of aspects 1 to 48.

Aspect 50: An apparatus for determining static occupancy, the apparatus comprising means for performing operations according to any of aspects 1 to 48.

What is claimed is:

1. An apparatus for detecting one or more static objects, comprising:
   at least one memory configured to store at least one image; and
   at least one processor coupled to the at least one memory and configured to:
   determine one or more pixels associated with one or more static objects depicted in one or more images of a three-dimensional space, wherein the one or more static objects are static with respect to the three-dimensional space;

obtain a point map including a plurality of map points, the plurality of map points corresponding to a portion of the three-dimensional space; and determine, based on the point map and the one or more pixels associated with the one or more static objects, a probability of occupancy by the one or more static objects in the portion of the three-dimensional space.

2. The apparatus of claim 1, wherein the one or more pixels associated with the one or more static objects are determined based on one or more machine learning models.

3. The apparatus of claim 2, wherein each machine learning model of the one or more machine learning models includes a deep learning neural network configured to predict that the one or more pixels are occupied by at least one object in the three-dimensional space.

4. The apparatus of claim 3, wherein the deep learning neural network is further configured to predict whether each pixel of the one or more pixels is associated with a static object or a dynamic object.

5. The apparatus of claim 2, wherein a machine learning model of the one or more machine learning models is associated with a camera used to capture an image of the one or more images.

6. The apparatus of claim 1, wherein, to determine the probability of occupancy by the one or more static objects in the portion of the three-dimensional space, the at least one processor is configured to determine a probability of occupancy for each cell in a grid associated with the portion of the three-dimensional space.

7. The apparatus of claim 6, wherein the at least one processor is configured to update the probability of occupancy for each cell using a Bayesian filter.

8. The apparatus of claim 6, wherein, to determine the probability of occupancy for each cell in the grid, the at least one processor is configured to determine probabilities of occupancy for all cells of the grid within a rectangular region around an object including the apparatus.

9. The apparatus of claim 8, wherein the object including the apparatus is a vehicle.

10. The apparatus of claim 6, the at least one processor is configured to:

determine, based on a pixel of the one or more pixels in a column of an image of the one or more images, a line of intersection of a plane of the grid and a plane corresponding to the column; and determine one or more probabilities of occupancy for one or more points along the line of intersection.

11. The apparatus of claim 10, the at least one processor is configured to determine a probability of occupancy for a cell in the grid at least in part by determining a representative probability of occupancy from at least the one or more probabilities of occupancy for the one or more points along the line of intersection.

12. The apparatus of claim 10, wherein the at least one processor is configured to determine one or more probabilities of occupancy based on information from the point map.

13. The apparatus of claim 12, wherein the information from the point map includes at least a height associated with a point on the plane of the grid.

14. The apparatus of claim 1, wherein the apparatus is included as part of a vehicle.

15. The apparatus of claim 14, wherein the portion of the three-dimensional space includes a driving surface in the three-dimensional space.

16. The apparatus of claim 15, wherein the one or more static objects are located on the driving surface.

17. The apparatus of claim 1, wherein the one or more pixels associated with the one or more static objects are generated at least in part by processing the one or more images using a computer vision algorithm.

18. The apparatus of claim 17, wherein the computer vision algorithm is configured to perform temporal tracking to estimate the one or more pixels.

19. The apparatus of claim 1, wherein each pixel of the one or more pixels is a lower-most pixel in a column of an image that is occupied by a static object of the one or more static objects in the three-dimensional space.

20. The apparatus of claim 19, wherein the column of the image includes a column of pixels of the image.

21. A method of detecting one or more static objects, the method comprising:

determining, by a computing device, one or more pixels associated with one or more static objects depicted in one or more images of a three-dimensional space, wherein the one or more static objects are static with respect to the three-dimensional space;

obtaining, by the computing device, a point map including a plurality of map points, the plurality of map points corresponding to a portion of the three-dimensional space; and determining, by the computing device based on the point map and the one or more pixels associated with the one or more static objects, a probability of occupancy by the one or more static objects in the portion of the three-dimensional space.

22. The method of claim 21, wherein the one or more pixels associated with the one or more static objects are determined based on one or more machine learning models.

23. The method of claim 22, wherein each machine learning model of the one or more machine learning models includes a deep learning neural network configured to predict that the one or more pixels are occupied by at least one object in the three-dimensional space.

24. The method of claim 23, wherein the deep learning neural network is further configured to predict whether each pixel of the one or more pixels is associated with a static object or a dynamic object.

25. The method of claim 22, wherein a machine learning model of the one or more machine learning models is associated with a camera used to capture an image of the one or more images.

26. The method of claim 21, wherein determining the probability of occupancy by the one or more static objects in the portion of the three-dimensional space includes determining a probability of occupancy for each cell in a grid associated with the portion of the three-dimensional space.

27. The method of claim 21, wherein the computing device is included as part of a vehicle.

28. The method of claim 27, wherein the portion of the three-dimensional space includes a driving surface in the three-dimensional space.

29. The method of claim 23, wherein each pixel of the one or more pixels is a lower-most pixel in a column of an image that is occupied by a static object of the one or more static objects in the three-dimensional space.

30. The method of claim 29, wherein the column of the image includes a column of pixels of the image.

* * * * *